United States Patent
Penman

(10) Patent No.: US 7,883,555 B2
(45) Date of Patent: Feb. 8, 2011

(54) FUEL REFORMING PROCESS FOR INTERNAL COMBUSTION ENGINES

(76) Inventor: Robert R. Penman, 158 Thornton Rd., Chestnut Hill, MA (US) 02467-3638

(*) Notice: Subject to any disclaimer, the term of this patent is extended or adjusted under 35 U.S.C. 154(b) by 0 days.

(21) Appl. No.: 12/816,664

(22) Filed: Jun. 16, 2010

(65) Prior Publication Data

US 2010/0307725 A1   Dec. 9, 2010

Related U.S. Application Data

(63) Continuation-in-part of application No. 12/609,401, filed on Oct. 30, 2009, now abandoned, which is a continuation-in-part of application No. 12/015,253, filed on Jan. 16, 2008, now abandoned.

(51) Int. Cl.
*F02B 43/10* (2006.01)
(52) U.S. Cl. .......................... 48/127.9; 123/3
(58) Field of Classification Search ............ 123/255, 123/272, 670, 3; 60/286, 287; 422/198
See application file for complete search history.

(56) References Cited

U.S. PATENT DOCUMENTS

| | | | |
|---|---|---|---|
| 3,911,896 A | 10/1975 | Charboneau et al. | |
| 4,499,863 A | 2/1985 | Gandhi et al. | |
| 5,118,451 A | 6/1992 | Lambert et al. | |
| 5,408,973 A | 4/1995 | Spangjer | |
| 2003/0010022 A1 | 1/2003 | Suzuki | |
| 2003/0131830 A1 | 7/2003 | Noble | |
| 2004/0151598 A1 | 8/2004 | Young et al. | |
| 2008/0107937 A1* | 5/2008 | Ravenda et al. | 429/19 |

FOREIGN PATENT DOCUMENTS

| | | |
|---|---|---|
| JP | 2004251196 A | 9/2004 |
| JP | 2006052688 A | 2/2006 |
| JP | 2007113461 A | 5/2007 |
| JP | 2007247491 A | 9/2007 |

OTHER PUBLICATIONS

International Search Report dated May 11, 2009 issued for International Application No. PCT/US2008/080618.

* cited by examiner

*Primary Examiner*—Alexa D Neckel
*Assistant Examiner*—Imran Akram
(74) *Attorney, Agent, or Firm*—Mark S. Leonardo; Brown Rudnick LLP

(57) ABSTRACT

A fuel reforming system, process, and device including a catalytic chamber and a heating chamber. The catalytic chamber, further including a fluid fuel intake and a gaseous fluid exit port and at least one heat exchanger for distributing heat between the heating chamber and the catalytic chamber. The catalytic chamber further including a screen member having a surface, wherein the member includes a catalytic deposit made from a combination of platinum and rhodium alloy. A catalytic conversion of converting liquid fuel to gaseous fuel occurs within the catalytic chamber. Fuel exits the fuel reforming device through a gaseous fluid exit port.

16 Claims, 24 Drawing Sheets

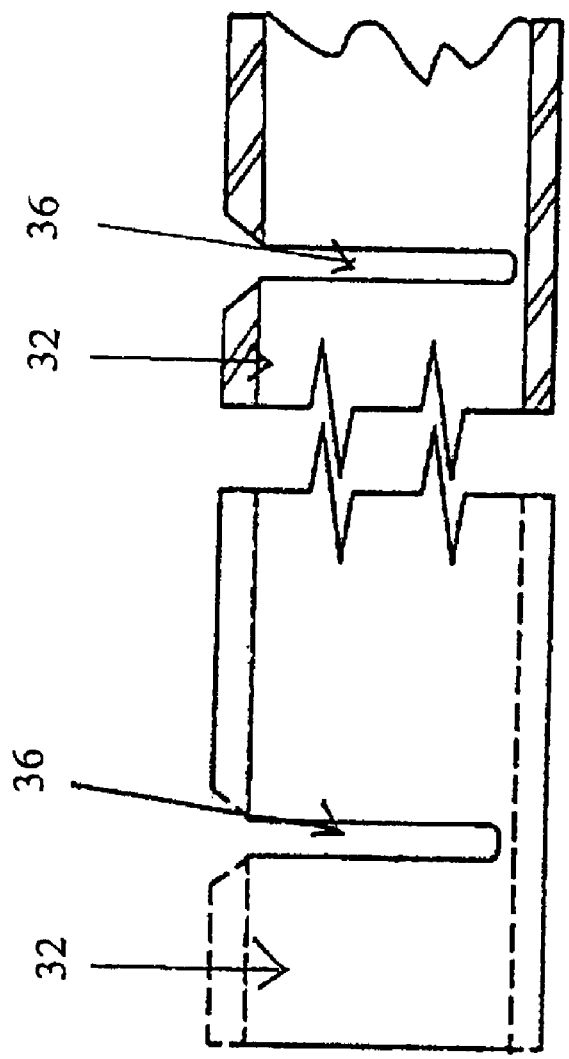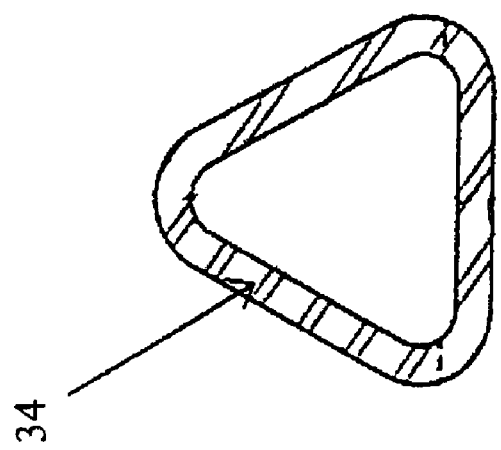
Fig. 8

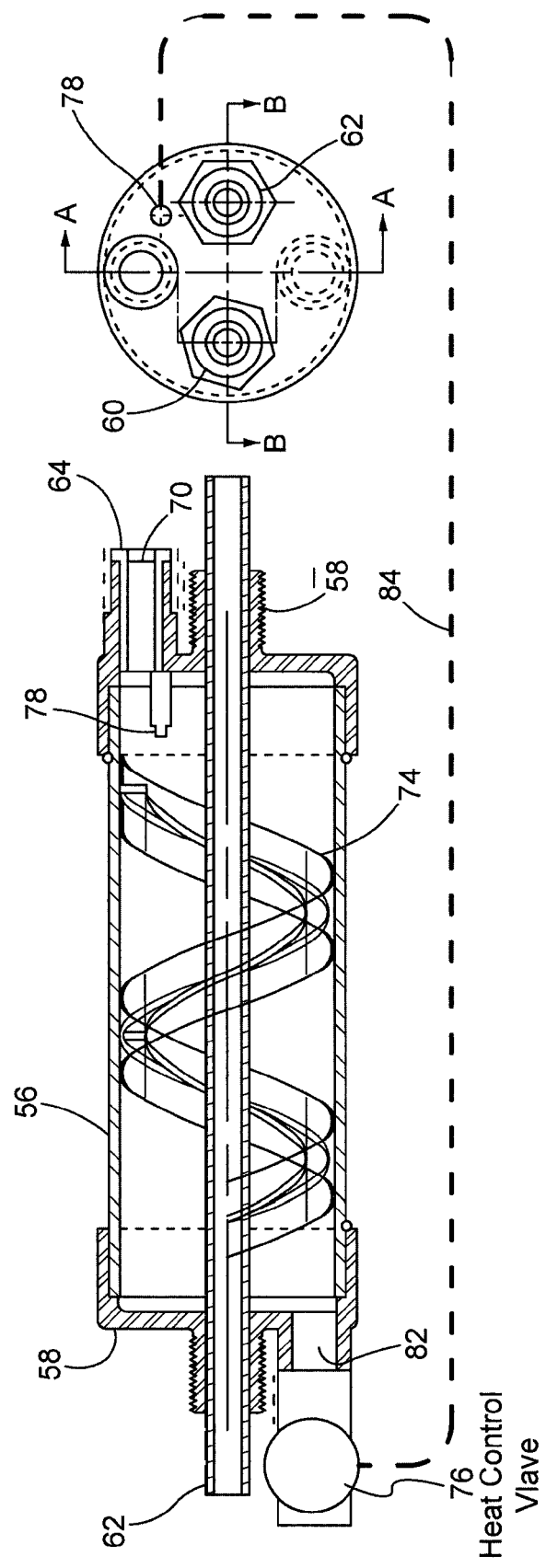

FUEL REFORMING PROCESS FOR INTERNAL COMBUSTION ENGINES

CROSS-REFERENCE TO RELATED APPLICATIONS

This patent application is a continuation-in-part of U.S. application Ser. No. 12/015,253 filed on Jan. 16, 2008 and Ser. No. 12/609,401 filed on Oct. 30, 2009, the entire contents of each are hereby incorporated herein in their entirety by reference.

BACKGROUND

1. Technical Field

The present invention generally relates to internal combustion engines, and more particularly, to a fuel reforming process that improves the efficiency of fuel consumption and reduces environmental pollutants generated by internal combustion engines.

2. Background of the Invention

In response to tightening EPA regulations on automobile exhaust, catalytic converters were introduced to the United States market in the 1970s. Catalytic converters are universally employed in automobile exhaust systems for the reduction of carbon monoxide, hydrocarbons, and oxides of nitrogen. Employed in generator sets, forklifts, mining equipment, trucks, buses, trains, autos, and other engine-equipped machines, catalytic converters provide an environment for a chemical reaction where toxic combustion by-products are converted to less-toxic substances.

Although exhaust catalytic converters remove noxious gases and reduce some green house gases, these devices suffer from several drawbacks. For example, prior art catalytic converters admit spent fuel in a gaseous form rather than a liquid form. Further, the conversion of gases within these devices does not reduce greenhouse pollutants at an efficient rate.

Due to the world's finite supply of fossil fuels, the problems of inefficient catalytic converters must be addressed. For example, if catalytic converters could admit a liquid fuel and convert it into a gaseous fuel product prior to combustion, fuel would burn cleaner resulting in reduced pollution and have a higher combustive power by virtue of increased enthalpy of the converted gaseous product. It would be highly desirable if exhaust catalytic converters in products using fossil fuels, diesel fuels, or aircraft fuels, including liquefied coal, could further reduce greenhouse gas pollutants such as methane, carbon dioxide, and nitrous oxide.

SUMMARY

Accordingly, a fuel reforming process for internal combustion engines is provided that is readily employed to increase the efficiency of the world's remaining fossil fuels through higher combustive power and increased enthalpy based upon thermodynamic analysis. This fuel reforming process produces a cleaner burning product and removes more greenhouse gas pollutants than prior art. Most desirably, the dissociation of water could produce the perfect fuel by eliminating the need for the exhaust catalytic converter. Theoretically, the products of combustion would only be water vapor, H2 and O. Additionally, green house contamination from combustion could be virtually zero. This process as applied to water, however, will require more experimentation and would require higher temperatures for dissociation than petroleum products and ethanol. The fuel reforming process for internal combustion engines resolves several disadvantages and drawbacks experienced in the art.

In a first aspect, a fuel reforming device is comprised of a catalytic chamber, a heating chamber, a fluid fuel intake and a converted gaseous fluid exit port. The catalytic chamber includes at least one heat exchanger for distributing heat between the heating chamber and the catalytic chamber. The catalytic chamber further includes at least one screen member that contains a catalytic deposit that is metallurgically clad upon the screen member's surface.

In one embodiment, the catalytic deposit is an alloy comprising platinum or rhodium or platinum. For example, a ratio of platinum to rhodium is ideally between 65:35 and 90:10. However, a ratio of 85:15 of platinum to rhodium is highly desirable. In another embodiment, the screen member may be comprised of a non-porous surface that facilitates the catalytic reaction. The catalytic reaction within the fuel reforming device may comprise converting a liquid fuel into a gaseous fuel. The device may also include a thermostat for controlling the temperature within the catalytic chamber. Electrical leads may also attach the thermostat to flow control valves. The flow control valves may also be attached to the heating chamber and may regulate the flow of heat into the catalytic chamber. In another embodiment, at least one heat exchanger distributes heat onto the catalytic chamber.

In a second aspect, a fuel reforming process for converting liquid fuel into gaseous fuel includes passing liquid fuel into the catalytic chamber through the fluid fuel intake port. The process further includes heating the liquid fuel until the maximum catalytic temperature is reached within the catalytic chamber. The liquid fuel is subsequently processed into a gaseous fuel and dispensed from the catalytic chamber through the gaseous fuel exit port.

In one embodiment, the maximum catalytic temperature may be between 400 to 700 degrees Fahrenheit. However, a maximum catalytic temperature between 450 to 600 degrees Fahrenheit is highly desirable.

In another aspect, a system for a fuel reforming device and a fuel reforming process is comprised of a catalytic chamber, a heating chamber, at least one heat exchanger, and a screen member. The catalytic chamber houses the conversion of liquid fuel into gaseous fuel as the liquid fuel is passed into the catalytic chamber. The system includes a heating chamber that provides heat to facilitate the conversion of liquid fuel into gaseous fuel within the catalytic chamber. The liquid fuel is heated until a maximum temperature is reached to facilitate the conversion of liquid fuel into gaseous fuel. The catalytic chamber includes at least one heat exchanger for distributing heat between the heating chamber and the catalytic chamber. This process occurs as liquid fuel is processed as it contacts a screen member which has a surface that contains a catalytic deposit.

In one embodiment, the catalytic deposit is an alloy comprising platinum and rhodium. The ratio of platinum to rhodium is substantially 85:15. In another embodiment, at least one heat exchanger distributes heat into the catalytic chamber until a maximum temperature of 450 to 600 degrees Fahrenheit is substantially attained for converting the liquid fuel into the gaseous fuel.

BRIEF DESCRIPTION OF THE DRAWINGS

The objects and features of the present disclosure, which are believed to be novel, are set forth with particularity in the appended claims. The present disclosure, both as to its organization and manner of operation, together with further objectives and advantages, may be best understood by reference to the following description, taken in connection with the accompanying drawings as set forth below:

FIG. 8 is a cross-sectional side view of the tubing and milled slots;
FIG. 10 is a cross-sectional view of an alternate embodiment of the fuel reforming device of the present disclosure;
FIG. 11 is a side view of an end cap of the fuel reforming device of FIG. 10.

DETAILED DESCRIPTION OF EXEMPLARY EMBODIMENTS

The present invention is directed towards a fuel reforming device for internal combustion engines, which are discussed in terms of internal combustion engines, and more particularly, to a fuel reforming process that increases fuel efficiency and reduces green house gas pollutants. The following discussion includes a description of the fuel reforming process, system, and device for internal combustion engines. Reference will now be made in detail to exemplary embodiments of the disclosure, which are illustrated in the accompanying figures.

Figure 1:
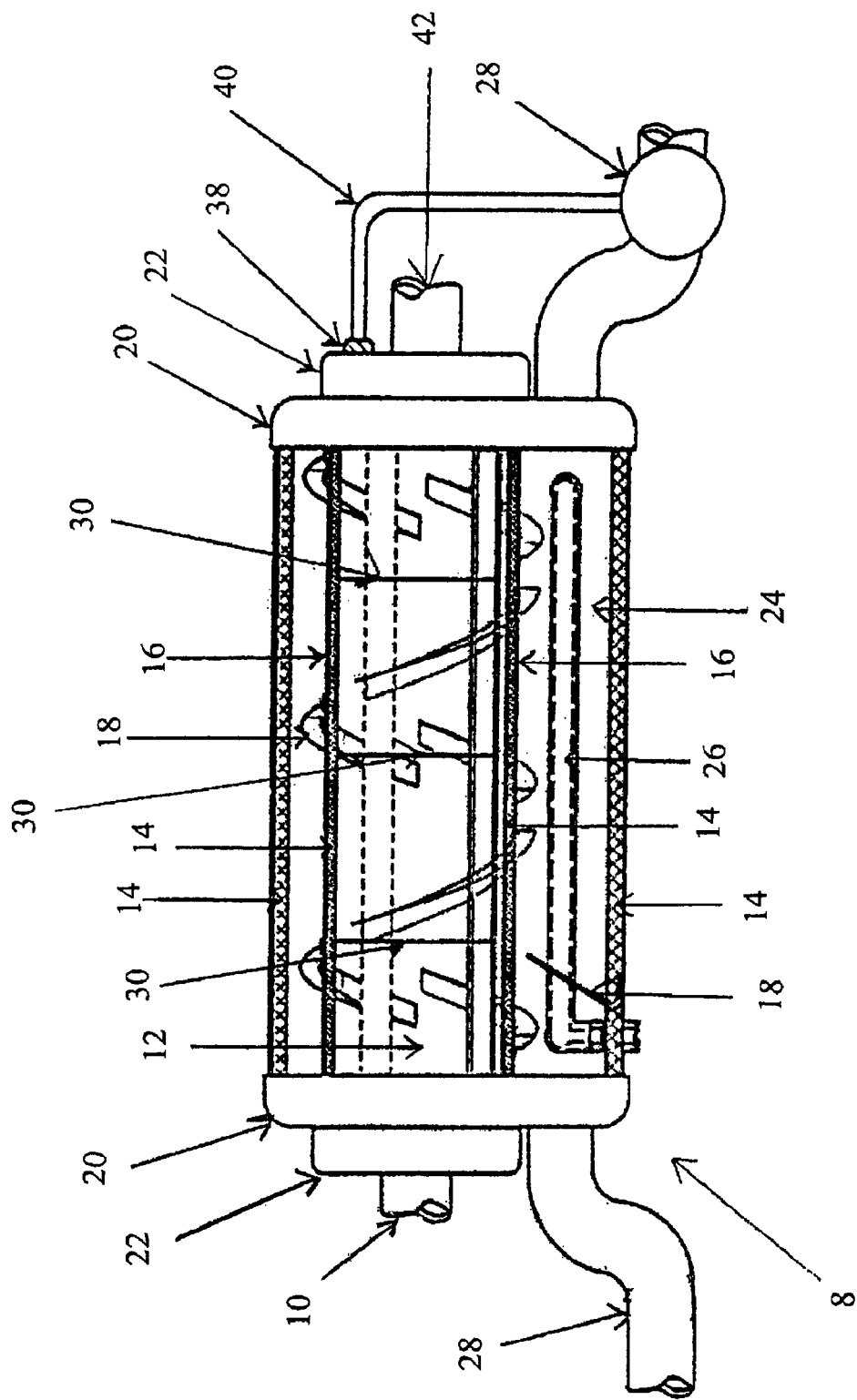
FIG. 1 is a side view of the fuel reforming chamber.

Referring to FIG. 1, a fuel reforming device 8 is designed to convert a liquid fuel that is passed from a fuel filter into a gaseous fuel prior to entering an engine's fuel injectors. The present disclosure is significantly smaller in size and is contained in comparison to prior art. The fuel reforming device 8 is installed onto injectors (not shown in the figures) to perform this process.

Figure 2:
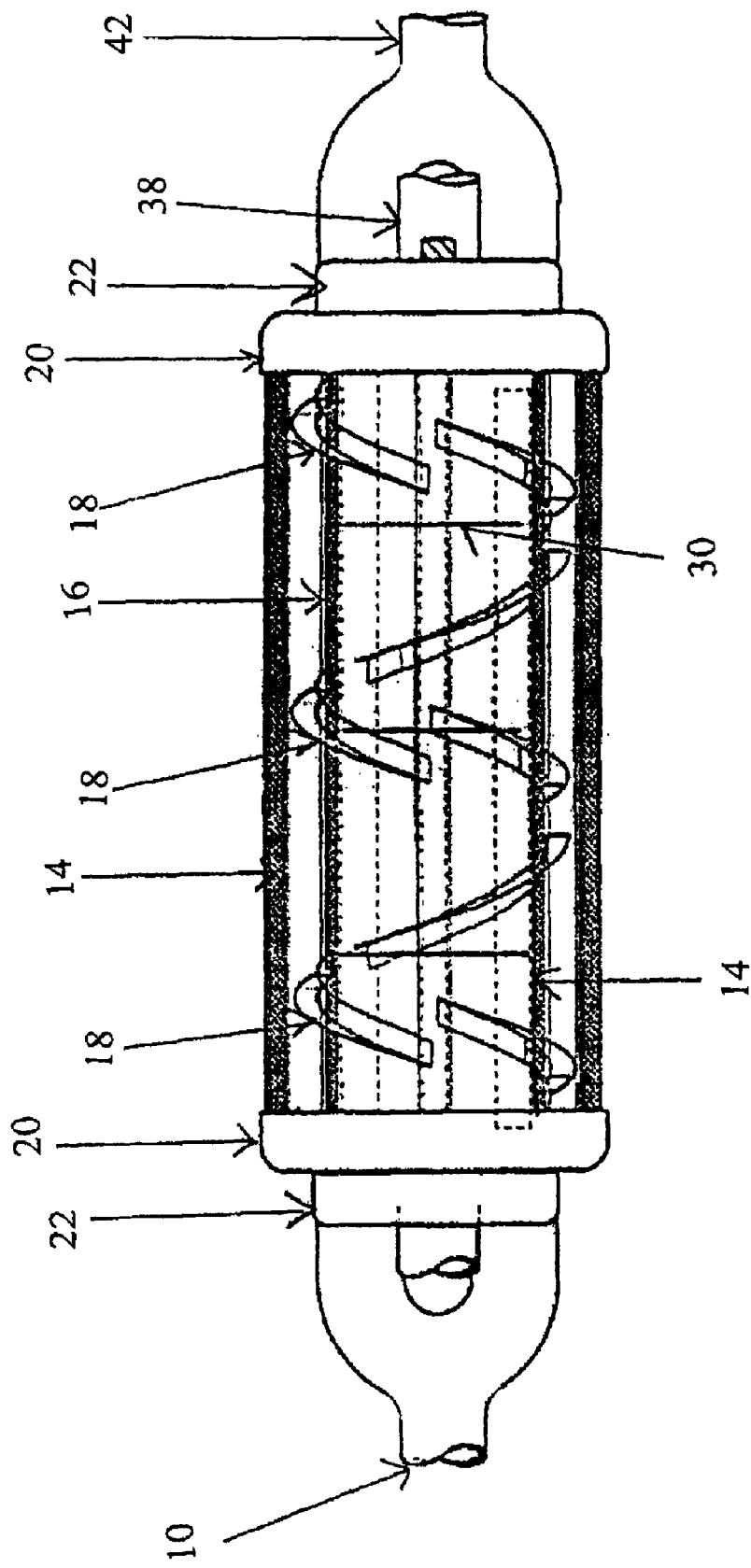
FIG. 2. is a top view of the fuel reforming chamber.
Figure 3:
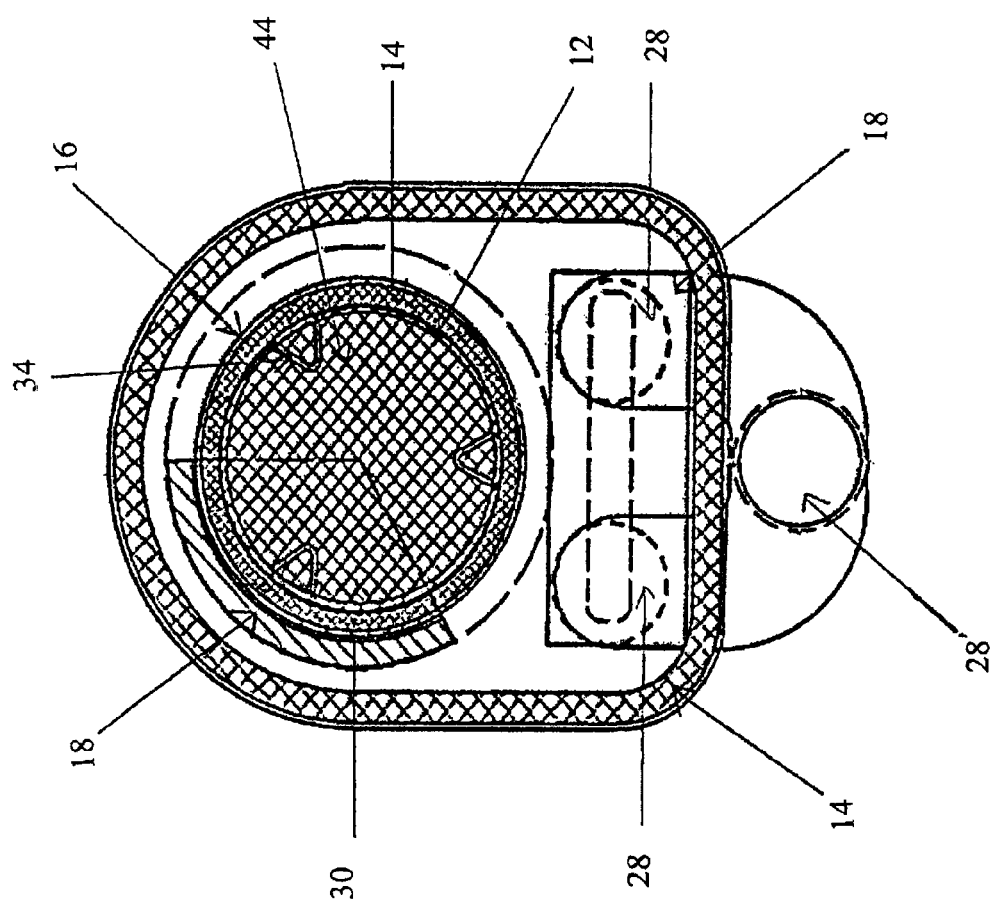
FIG. 3 is an inlet end view of the fuel reforming chamber.
Figure 4:
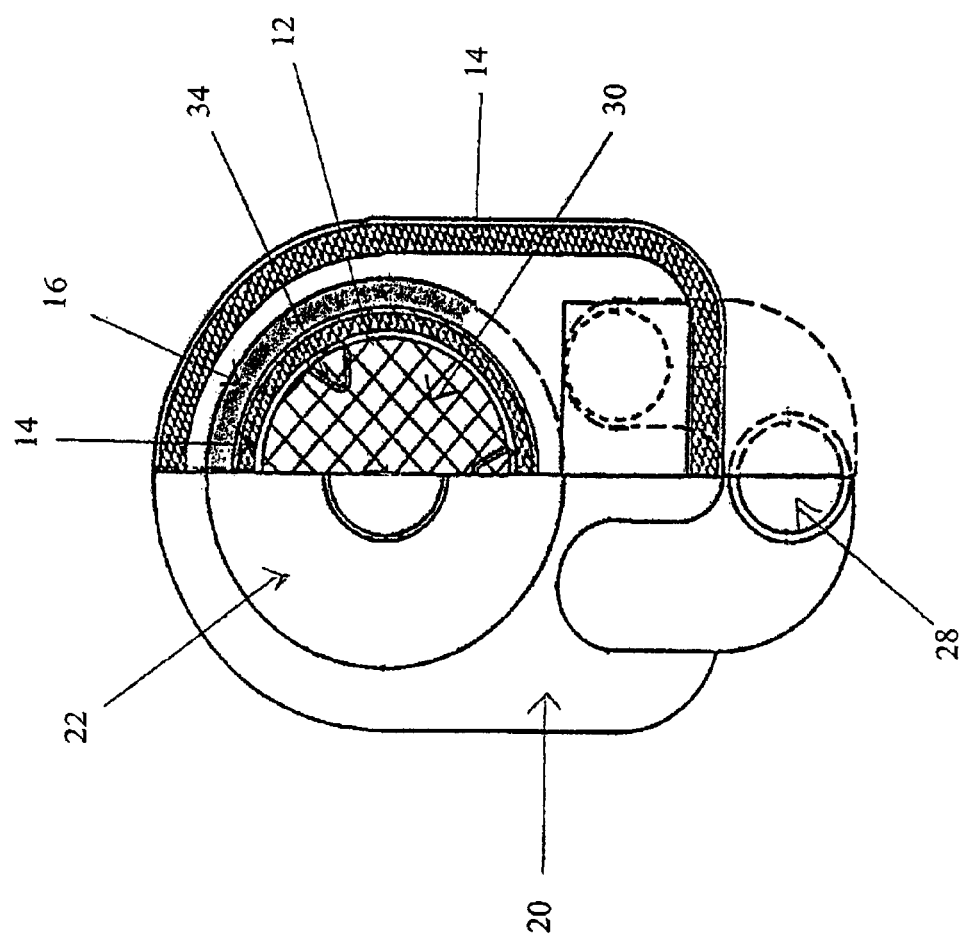
FIG. 4 is a partial end view section of the fuel reforming chamber.
Figure 5:
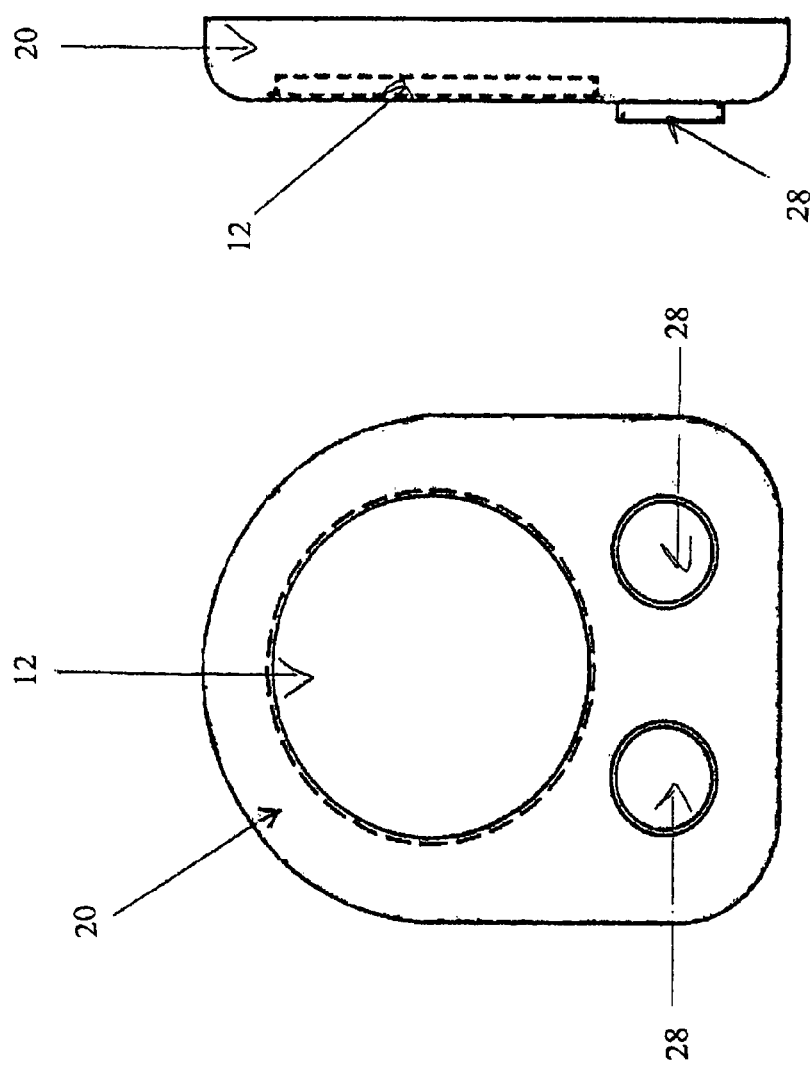
FIG. 5 is a front and side view of the heat jacket caps.
Figure 6:
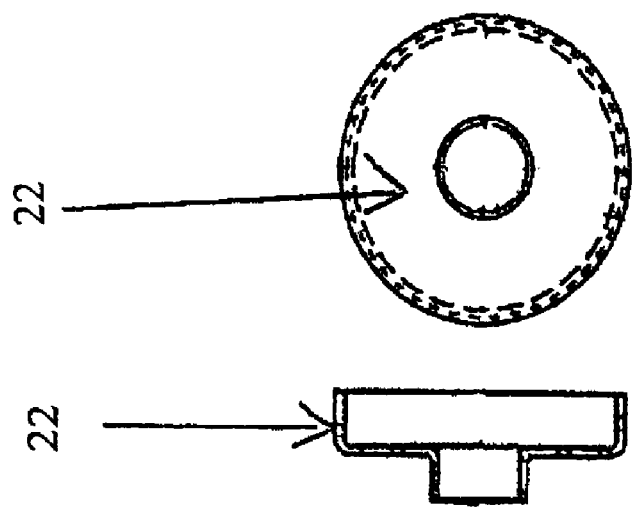
FIG. 6 is a front and side view of the fuel chamber caps.
Figure 7:
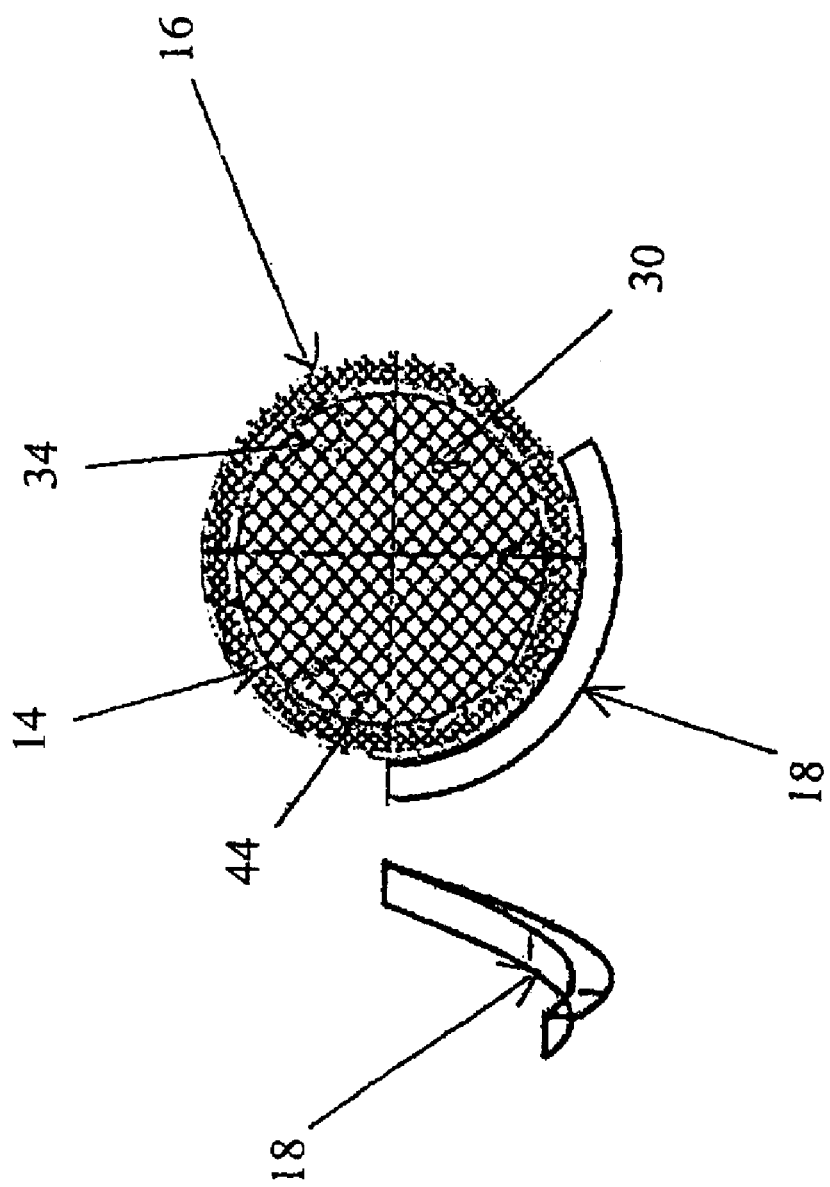
FIG. 7 is a front and side view of the heat exchanger and screen member.

Referring to FIGS. 1-2, the liquid fuel exits the fuel filter and enters a fluid fuel entry port 42. The fluid fuel entry port 42 is a passage that directly connects the fuel filter to a catalytic chamber 12. Within the fluid fuel entry port 42, fuel passes in an undisturbed liquid state by force of external pressure into the catalytic chamber 12. The catalytic chamber 12 is a structure where a catalytic conversion of liquid fuel into gaseous fuel takes place. The choice of materials to construct the catalytic chamber 12 is dependant upon the temperature required for the catalytic conversion. Any material that is capable of withstanding high degrees of temperature is suitable for the catalytic chamber 12. Materials such as stainless steel metals are generally preferred. However, other embodiments may use different metals or other materials to create the catalytic chamber 12.

Referring to FIGS. 1-4, the catalytic chamber 12 includes a screen member 30. The catalytic conversion of liquid fuel into gaseous fuel occurs as liquid fuel passes over and through the screen member 30. It is contemplated that the screen member 30 may be a screen or other configuration that provides a surface which can support a catalyst deposit 44. It is well known in the art that catalysts are required to facilitate the conversion of liquid fuel into gaseous fuel. In a preferred embodiment of this invention, the surface of the screen member 30 is flat and burr free as a result of a metal forming process such as "fine blanking" and is metallurgically clad with an alloy of platinum and rhodium. The ratio of platinum and rhodium is ideally between sixty-five to thirty-five (65:35) and ninety to ten (90:10). However, a ratio of eighty-five to fifteen (85:15) of platinum and rhodium is preferable. Other embodiments may include additions to replace and dilute either, or both, the alloy of platinum and rhodium with elements such as Iridium, Gold, Palladium, Silver, Copper, with small additions of trace elements such as Strontium, Actinium, Thorium, Cesium, Thulium, and Ytterbium.

The screen member 30 preferably provides a non-porous surface whereupon a catalytic deposit 44 may clad. Non-porous materials (i.e., stainless steel wire of 304 series class) are ideal for cladding. In one particular embodiment, the clad may range from 0.0002" to 0.0003" of an inch thickness on stainless steel wire ending at 0.015" to 0.018" diameter. It is well known in the art that other embodiments may achieve similar results with any measurements of alloy thickness. Prior art catalytic converters use platinum and rhodium alloy deposited over a ceramic honeycomb surface for support. These catalytic converters, however, are incapable of facilitating a liquid fuel to gaseous fuel conversion due to clogging and the possibility of dirt and dust admitted into the combustion system.

The catalytic conversion of a liquid fuel to a gaseous fuel requires an environment that can maintain high degrees of temperature. Heat insulating materials may surround the catalytic chamber 12. A ceramic lining 14 is a type of heat insulating material that is suitable for this purpose. Other materials that can act as heat insulators may be used in this device. These heat insulating materials should resist spalling and cracking from thermal shock and handling.

An outer shell 16 may surround the catalytic chamber 12. The ceramic lining 14 may line the interior of the outer shell 16. The outer shell 16 may be comprised of, but is not limited to, materials such as stainless steel. A heat exchanger 18 may be secured to the outer shell 16 through methods such as spot welding. It is well known in the art that the heat exchanger 18 may be secured to the outer shell 16 through alternative means. It is contemplated that the heat exchanger 18 may be, but is not limited to, materials such as baffle segments, barriers, and fins. At least one heat exchanger 18 may attach to the outer shell 16 and can act as a circulation path for heat, through conduction, within the catalytic chamber 12.

Referring to FIGS. 1-6, heat jacket caps 20 retain the catalytic chamber 12 in alignment. The fuel chamber caps 22 clamp the heat jacket caps 20 and the catalytic chamber 12 assemblies together and form a hermetic seal. The heat jacket caps 20 and fuel chamber caps 22 may be composed of materials such as stainless steel and may be coated with a high temperature cement.

Liquid fuel is heated beyond its standard operating temperature by a heating chamber 24 located above and below the catalytic chamber 12. The heating chamber 24 contains an auxiliary electric heating element 26 and the heat exchanger 18 to deflect heat to the catalytic chamber 12. The ceramic lining 14 may serve as heat insulation and surround the heating chamber 24 to maintain the temperature within the heating chamber 24.

Heat is directed by force of external pressure into the heating chamber 24 from a flow control valve 28 located below the fluid fuel entry port 42. The flow control valves 28 may disburse heat emitted from an automobile engine exhaust manifold to the heating chamber. This heat may be directed upward by the heat exchanger 18 to distribute the heat uniformly over the catalytic chamber 12. The totality of heat emitted by the heat chamber 24 and the flow control valve 28 is insufficient to reach the required temperature for the catalytic conversion. It is well known in the art that a temperature substantially within the range of 400 to 700 degrees Fahrenheit is required to facilitate a catalytic conversion of liquid fuel to gaseous fuel. However, other end temperature ranges as would be understood in the art may facilitate a catalytic conversion and therefore, is contemplated herein.

A thermostat 38 may gauge the temperature of the catalytic chamber 12. Heat exchanger 18 circulates heat around the catalytic chamber 12 to achieve a preferred maximum catalytic temperature of 450 to 600 degrees Fahrenheit for the catalytic conversion. A pair of leads 40 may attach the thermostat 38 to the flow control valve 28. The leads 40 may send an electrical current from the thermostat 38 to the flow control valve 28 when chamber temperature is substantially between 450 to 600 degrees Fahrenheit. The flow of hot air from the flow control valve 28 into the heating chamber 12 will be ceased upon achieving the required temperature.

Figure 9:
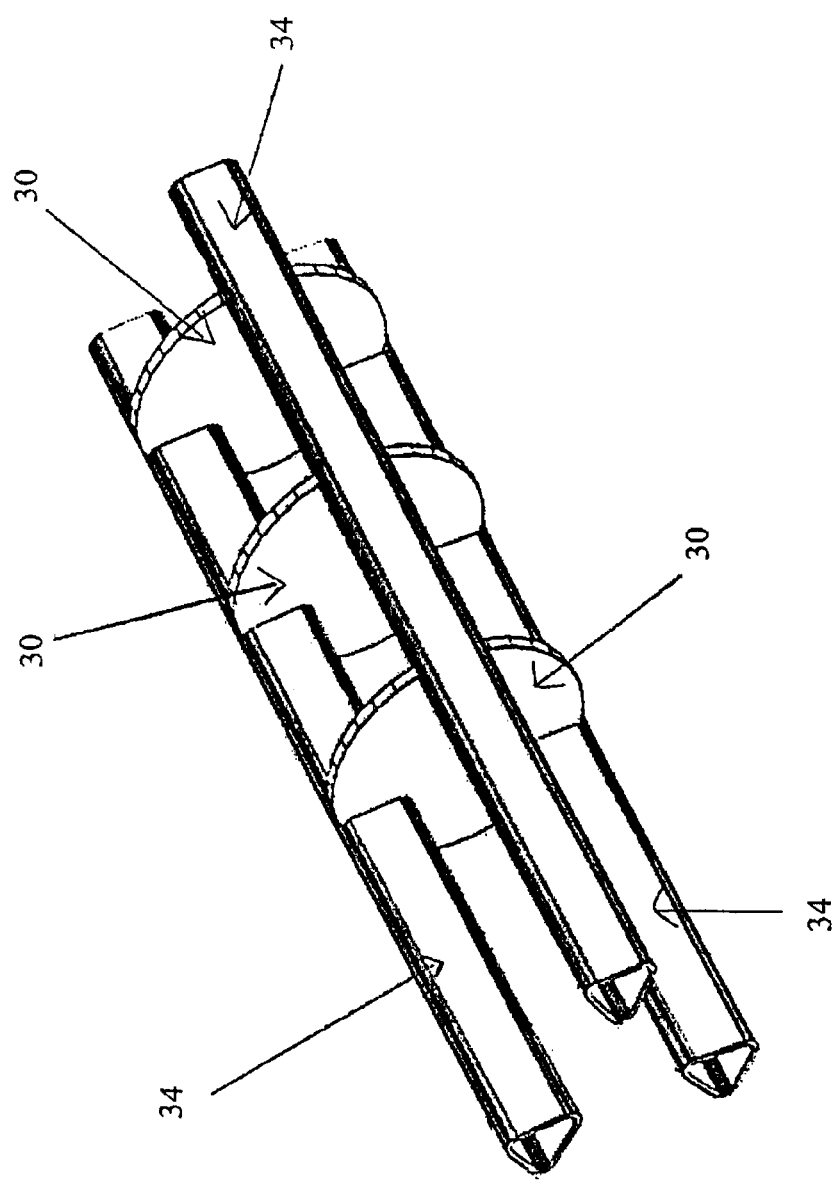
FIGS. 9 and 9A are perspective views of the tubing and screen members.
Figure 9A:
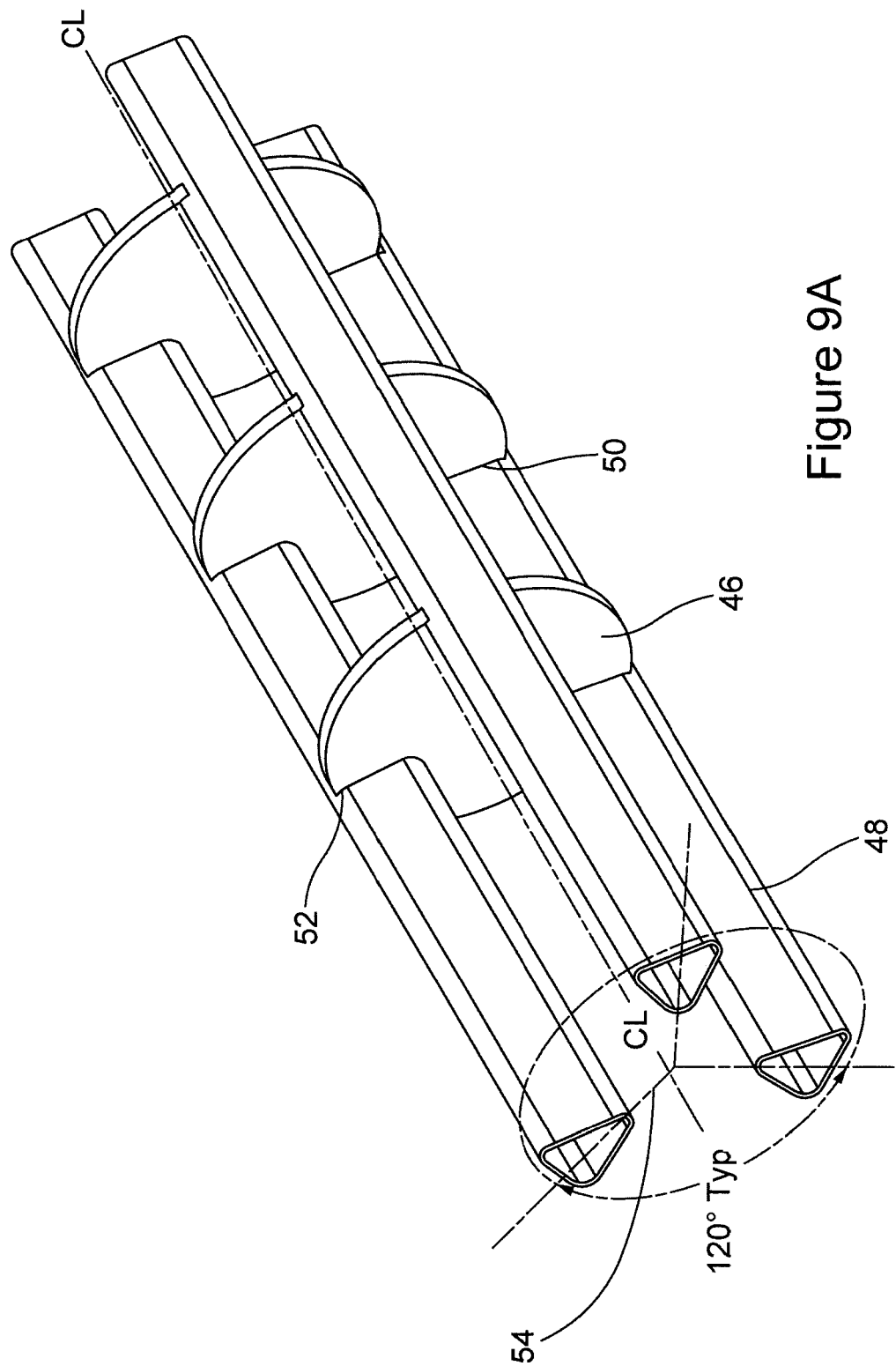
Figure 12:
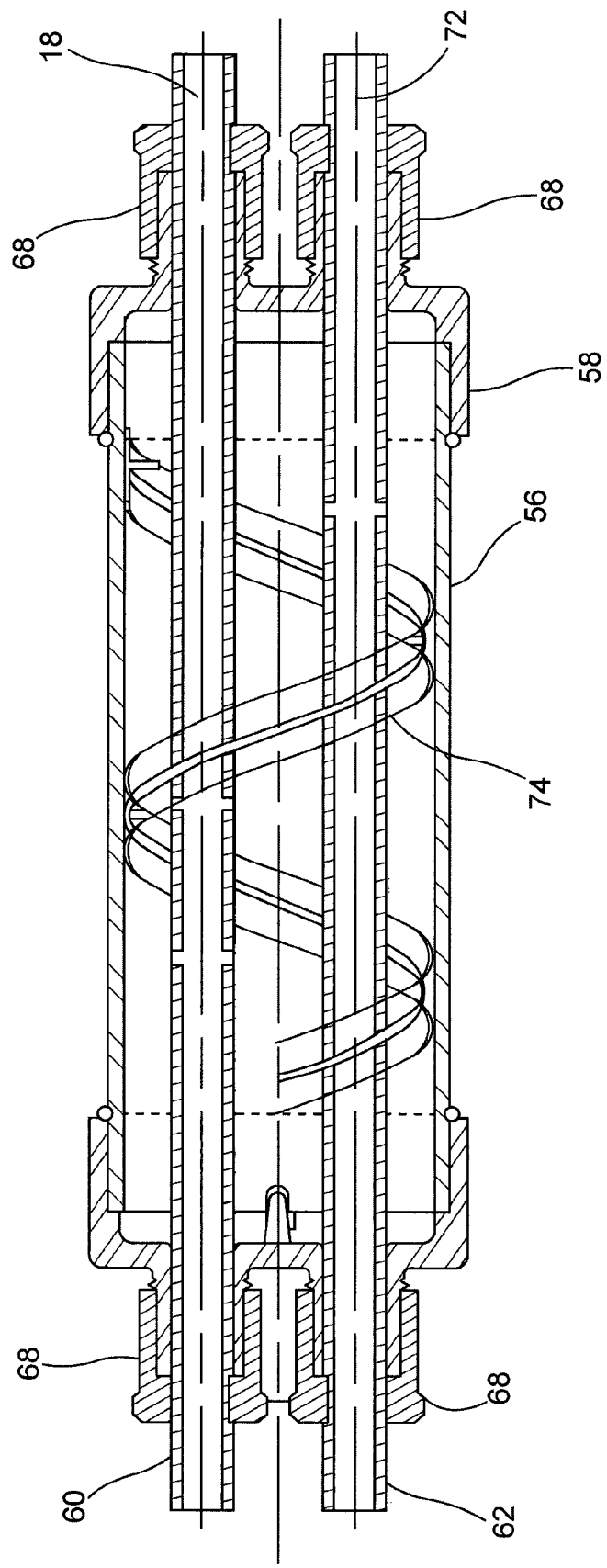
FIG. 12 is a cross-sectional view of an alternate embodiment of the fuel reforming device of the present disclosure.
Figure 13:
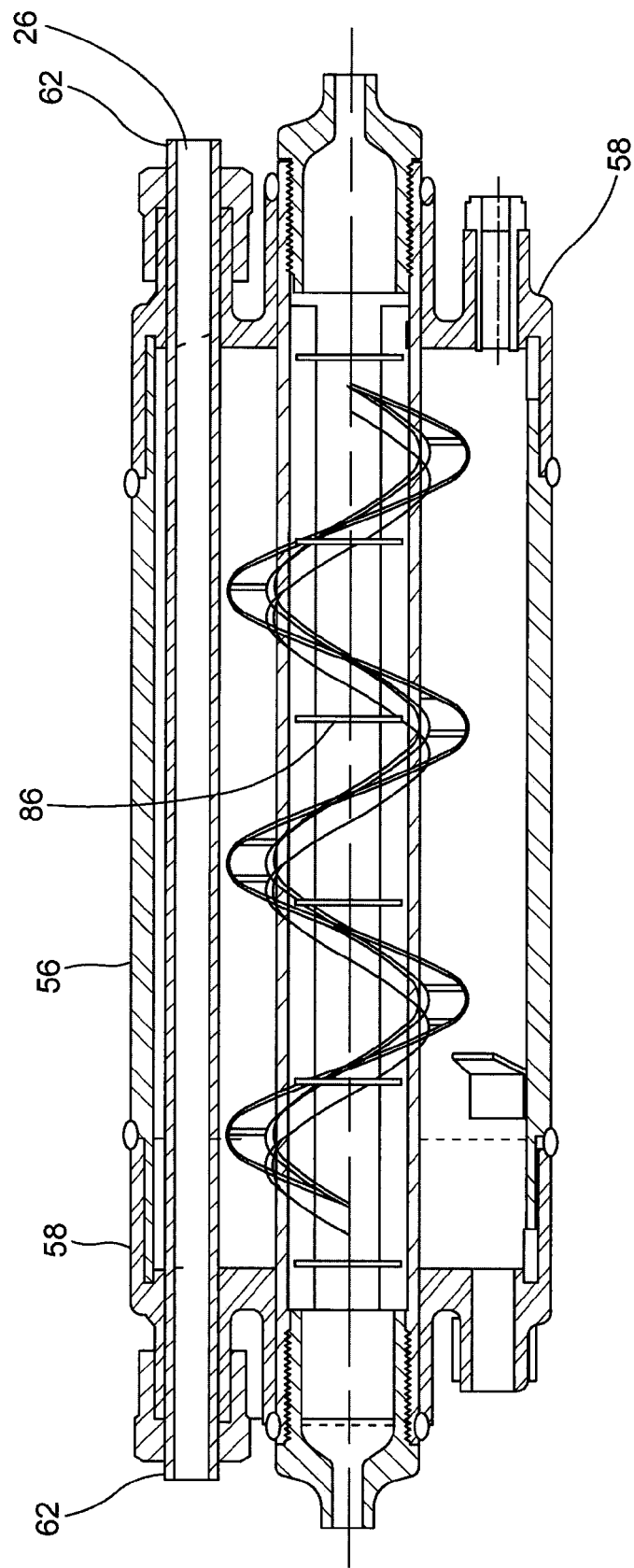
FIG. 13 is a cross-sectional view of an alternate embodiment of the fuel reforming device of the present disclosure.

Referring to FIGS. 1-9A, the screen member 30 may be secured by spacer sleeves 32. The spacer sleeves 32 separate and clamp the screen member 30 in position to prevent movement during the catalytic conversion. The spacer sleeves 32 may be made from tubing 34 and may be composed of stainless steel. It is also possible to design the spacer sleeves 32 in other shapes such as circular, oval, rectangular, or polygonal. The tubing 34 may accommodate one or more screen members 30. Milled slots 36 are located throughout the spacer sleeves 32 to ensure the screen member 30 fits snuggly. The number and spacing of the milled slots 36 may be determined by the specific size of the catalytic chamber 12 and the number of screen members 30 required. The width of milled slots 36 may be determined by the thickness of the screen member 30. Referring to FIG. 9A, a catalytic screen assembly is shown. The screen assembly includes catalytic clad screen members 46 (preferably, numbering from 1 to 8), triangular or "U" shaped tubing preferably made from Inconel 600, retaining slots for retaining the clad screens 46, and the spacing of the tubes 48 in a circular or semi-circular spacing.

Referring to FIGS. 10-13, an alternate embodiment of the fuel reforming device is disclosed. The fuel reforming device may include a heat exchanger tube enclosing combustion air and octane fuel tubes 56, precision cast (of Inconel 600) end caps 58 being threaded for receiving combustion air and fuel tubes 62, combustion air tube that is threaded along its length 60, octane fuel tube that is threaded along its length 62, a reducer 64 for exiting spent heat and creating backpressure of the exhaust gasses, and locking nuts for preventing leakage of air or octane fuel 68. The spent heat is exited to the exhaust catalytic converter by way of port 70 and heated octane is converted to gas and sent to injectors of an engine 72. The device further includes baffles as deflectors 74, solenoid connection on/off control of heat source 76, heat sensor 78, heated ambient combustion air to injectors of an engine 80, a flapper valve connection for controlling heat input 82 and a sensor feedback loop 84. In an alternate embodiment of the fuel reforming device, catalytic screens 86 are included as discussed herein.

The catalytic reaction of converting liquid fuel to gaseous fuel occurs at a temperature of 450 to 600 degrees Fahrenheit as the liquid fuel passes through the screen member 30 and contacts the catalytic deposit 44. Internal pressure develops within the catalytic chamber 12 and moves the liquid fuel across the screen members 30. Fuel exits the catalytic chamber 12 in a gaseous state through the gaseous exit port 10. The gaseous exit port 10 transports gaseous fuel to injectors.

External batteries may be used as a source of energy to facilitate the catalytic conversion. For example, lithium-ion batteries or solar energy sources either on the roof of vehicles, outside on the roof of a home for household purposes, or power generators are one of many possible energy sources in the event an automobile's standard battery is inadequate. This external battery would supply power to the auxiliary electric heating element 26.

The present description will have a higher octane number than the original fuel in prior art, which will allow for a spark-ignited Otto cycle with a higher compression ratio, thereby improving efficiency. Such gains could ultimately increase the world's finite fuel supply from a minimum of 5% to the order of 20%+over the next twenty five to thirty years while producing a cleaner burning product which reduces pollution of the environment and favorably influence global warming and health issues. Thermodynamic analysis has shown that the enthalpy of the catalytic gaseous product is increased. Furthermore, the fuel reforming process could increase the marketability of vehicles through greater ease of compliance with fuel standards such as CAFE.

The present description will also result in decreased fuel consumption, while creating lowered gaseous byproducts in each power stroke in the combustion cycle. Thus, reducing noxious gases and carbon particles in the exhaust stroke in the combustion cycle. The reduction of soot would be particularly advantageous to the aircraft industry and diesel fuel users reducing environmental hazards overall. As a result of these advantages, the miles per gallon of fuel would also increase significantly, reducing the world's demand on the limited supply of fossil fuels. This would produce a large economic stimulus to business and households in general. Additionally, these results would be of great advantage for automotive products, aircraft and off road vehicles.

The present invention could also improve more efficient use of liquid fuels in operations, such as oil fired burner equipment used for home heating and power plant electrical generating systems. These applications will also require additional energy input to keep the catalytic chamber 12 hot enough to carry out the conversion reaction, such as, for example, a solar power assist mechanism.

The dissociation of water could produce the perfect fuel by eliminating the need for the exhaust catalytic converter. Theoretically, the products of combustion would only be water vapor, H2, and O. Additionally, green house contamination from combustion would be virtually zero. The present invention reduces green house gas pollutants from present day liquid petroleum fuels and potentially liquefied coal products. This process, as applied to water, however, will require more experimentation, and would require higher temperatures for dissociation than petroleum products and ethanol.

In an alternative embodiment of the present disclosure, a combination module combines both air and octane fuel heated to a uniform temperature between 450° F. and 600° F., for example, and is fed into the combustion chamber of the Carnot cycle engine. Thermodynamic data shows that heating both the fuel and the combustion air assures a significant increased level of Enthalpy (heat content of the fuel mixture), primarily from the conversion of the liquid phase of octane to the gaseous phase, with no change of molecular composition of the octane fuel with, or without, heated air. Due to the significant increase in Enthalpy of the catalytically converted octane and heated air, that gain would be as much as 13% to 15% higher than presently experienced by typical Carnot cycle engines. A similar gain would be experienced without catalytic conversion of 12% to 13% by both air and octane heated to the same temperature levels of 450° F. and 600° F., for example. The economics and differences in MPG and effluent reductions of each process will determine which of the two systems designed is to be used. Unheated air simply reduces the temperature of the gaseous phase of octane, thus reducing the Enthalpy of the combustible mixture. It also explains why present, prior art, carburetion systems are inefficient, plus creating engine knock and pinging, caused by non-uniform globular mixtures of octane liquid fuel and air at ambient temperature. Such a system produces a minimum Enthalpy, and seasonal temperatures changes in fuel efficiency show this to be the case. Such a redesigned system would be of great value to diesel and jet fueled engines, increasing MPG and greatly reducing environmental pollution by using air and octane fuels at increased temperature.

Catalytic screens may generally consist of platinum family alloys, such as PD/RH alloyed with nickel and manganese, and metallurgical process bonding (clad) onto 304 SS wire that ends up at 0.015" to 0.018" diameter, for example, where the clad thickness of the platinum family alloy ranges from 0.0002" to 0.0003" thickness. The number of screens in an assembly could range from 1 to 8, for example, over the length of the assembly of a full catalytic system. Diameter of the screens could also vary between 0.5" diameters to 1.5" diameter (20 to 40 mesh). For the Aftermarket module, the diameter would be much smaller, and would consist of one screen at the exit point of the heated fuel into the combustion chamber. Fuel begins to convert to the gas phase at 258° F. The catalyst would primarily be an aid in enabling and assisting the conversion process, and maintaining the full gas phase.

The screen would be installed at the final exit point prior to combustion. Wherever threaded joints are used, those joints are to be coated with, for example, Cotronics Threadlocker Red™ (RESBOND 907TS), which is effective from –300° F. to 2100° F., and resists vibration and shock.

In this alternate embodiment, the fuel reformer of its present disclosure would normally be non-catalytic and relies on using external heat from the exhaust manifold for the air and liquid Octane ($C_8H_{18}$). The device is a combination of air and liquid octane tubes captured in a heat exchanger tube, which is hermetically sealed. A temperature probe on the exit end of the hot exhaust gases end cap controls the temperature of the assembly. The temperature sensing probe control sends the on/off signal to a solenoid butterfly (flapper) valve at the end cap entrance end, maintaining a uniform temperature throughout the running cycle of the engine. This design would be best suited for the after market segment where the efficiency of the Enthalpy (heat value of the heated fuel) will produce an improvement of 12% to 13%. It is envisioned that one 0.5" diameter clad screens (20 to 40 mesh) or other catalytic member could be added at the exit end where the heated octane goes directly into the combustion chamber.

The octane fuel line and combustion air line are fully threaded over entire length of the device and both are turned into assembly by turning through both end cap extensions that have been treated with, for example, Cotronics Threadlocker Red™ (RESBOND 907TS), in addition to locking nuts on both entrance and exit ends. These added factors are to assure 100% hermetic sealing within the heat exchanger tube. The full length threaded condition also promotes turbulence of the hot exhaust manifold gases versus that of a smooth tube, which promotes lamellar flow and an insulating layer for preventing good heat transfer.

In alternate embodiments of the present disclosure, a fuel-reforming module that utilizes waste heat from the exhaust manifold of an engine, which is compact enough to be installed between the fuel inlet after the fuel filter, and the outlet to the carburetion or injector system, is disclosed.

The resulting composition of fuel that would be fed into the carburetion, injector system or cylinders would be a gaseous fuel with the same chemical composition as the original liquid octane fuel, but with a considerably higher Enthalpy, and hence higher energy of combustion than the original liquid octane fuel. In prior art combustion processes, the total Enthalpy of combustion is reduced due to the conversion of the liquid fuel into gas requires an added supply of heat. There is a resulting loss in energy of combustion of liquid fuel as compared to direct combustion of pre-heated gaseous fuel. The proposed conversion of the present disclosure thus enables a greater energy of combustion from a given mol of fuel input. Thermodynamic analysis data has shown that preheating the combustion air supply can increase Enthalpy by an additional 2% to 3% over the original heating of fuel only. Combined with the process of the present disclosure, increases of Enthalpy of 13% to 15% have been shown.

Thermodynamic evaluations of the inventions of the present disclosure have been done relating to the conversion process. Calculations were carried out with octane ($C_8H_{14}18$) as the fuel example and the results showed significant Enthalpy advantage to be gained from conversion of the liquid fuel to gas prior to its introduction into the combustion chamber of an engine.

Examples of these evaluations are shown. The experiments and calculations disclose that the proposed processes of the present disclosure result in conversion of liquid octane ($C_8H_{18}$), of identical chemical composition, resulting in combustion fuel with significant Enthalpy increases.

A significant benefit of the catalytic conversion of the present disclosure is that the resulting gaseous fuel will undergo a more homogenous and complete combustion than that associated with prior art liquid fuel combustion performed at ambient temperature, which is the source of lower miles per gallon ("MPG"), and associated engine knock and ping. Other additional benefits include, among others (1) because of significant increases in heating value of the fuel through the use of waste heat from the exhaust manifold that increases octane Enthalpy, the MPG of fuel will be increased. Less fuel per mile will be required, resulting in a concurrent reduction in effluent to the atmosphere. This represents an important contribution towards a greener environment, and (2) because a more complete and homogeneous combustion will be achieved, serious contributors to pollution such as soot $CO_2$, $NO_x$, and $CH_4$ will be reduced. These benefits and the inventions of the present disclosure also apply to diesel engines and jet aircraft engines.

By using the waste heat from the exhaust manifold of an engine, or bled off the compressor stage of a jet engine, for example, the liquid petroleum fuel would pass over catalytic ensuing materials, for example, 304 SS screens, clad with PD/RH as an alloy of Nickel; 75% Ni, PD 15%, RH 9%, and Manganese 1%. This would constitute the clad surface triggering the catalysis. The reaction would take place in a hermetically sealed chamber, and convert liquid fuel to gaseous fuel in a heated environment, for example, starting at 258° F. and delivered to the combustion process at 450° F. to 600° F. The catalytic reaction chamber (CRC) would be heated to a temperature range between, for example, 450° F. and 600° F. The gas phase would start generally at 258° F., which is the boiling point of octane ($C_8H_{18}$).

Catalysis will assure complete conversion in the short period of time octane fuel will be exposed in the catalytic chamber, and as acceleration is required, that assurance of uniformity of gaseous fuel must be uniform and continuous. The carburetion system of an engine will be calibrated to a uniform and consistent production throughout the driving or idling period. It is envisioned that modifications of the invention may be offered without catalysis.

It is contemplated that the aftermarket automotive market would benefit, along with the original equipment manufacture from the invention of the present disclosure. A catalysis free version could possibly be reasonable and desirable for older vehicles. The benefits in MPG and reduced pollution would be significant enough for owners of older vehicles to want the improvement.

Examples and Test Results

Examples and test results of the inventions of the present disclosure have been carried out to determine the following (1) composition of the gas phase resulting from the liquid to gas conversion at different temperatures, (2) enthalpy effects associated with combustion of the gas at different temperatures and for different fuel conversion temperatures, (3) adiabatic temperatures associated with the combustion for different conversion temperatures, and (4) composition of the gas phase resulting from the combustion as it cools to ambient temperatures.

The calculations made in the Examples are compared, where appropriate, to the corresponding situation for liquid fuel combustion. While the general conditions associated with the proposed process were first investigated for combustion of the fuel with pure oxygen, additional calculations relate to combustion with air. All calculations have been carried out for 1 atm. Pressure.

The test calculations have been carried out using $C_8H_{18}$ and $C_{10}H_{22}$ as starting fuel, since thermodynamic data are available both for the liquid and gaseous states. The composition of fuels used in practice, particularly aircraft fuels, is more complex. Nevertheless, the general conclusions obtained from the present calculations will still be relevant.

A. Composition of the Gas Phase Resulting from Fuel Reforming

Figure 14:
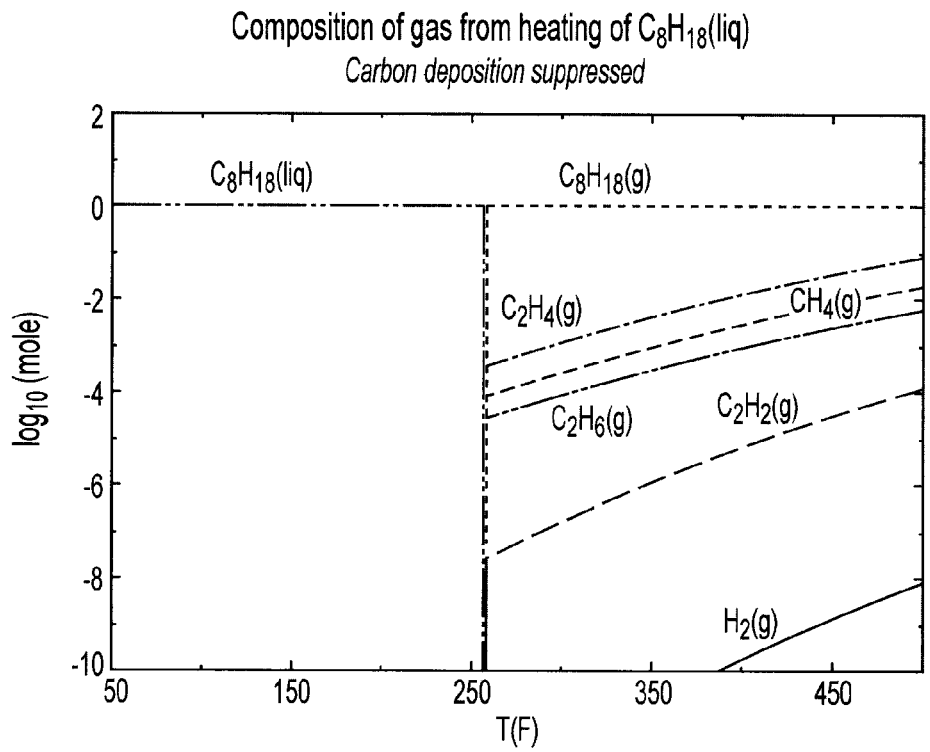
FIGS. 14-35 are examples showing fuel composition analysis according to the present disclosure.
Figure 15:
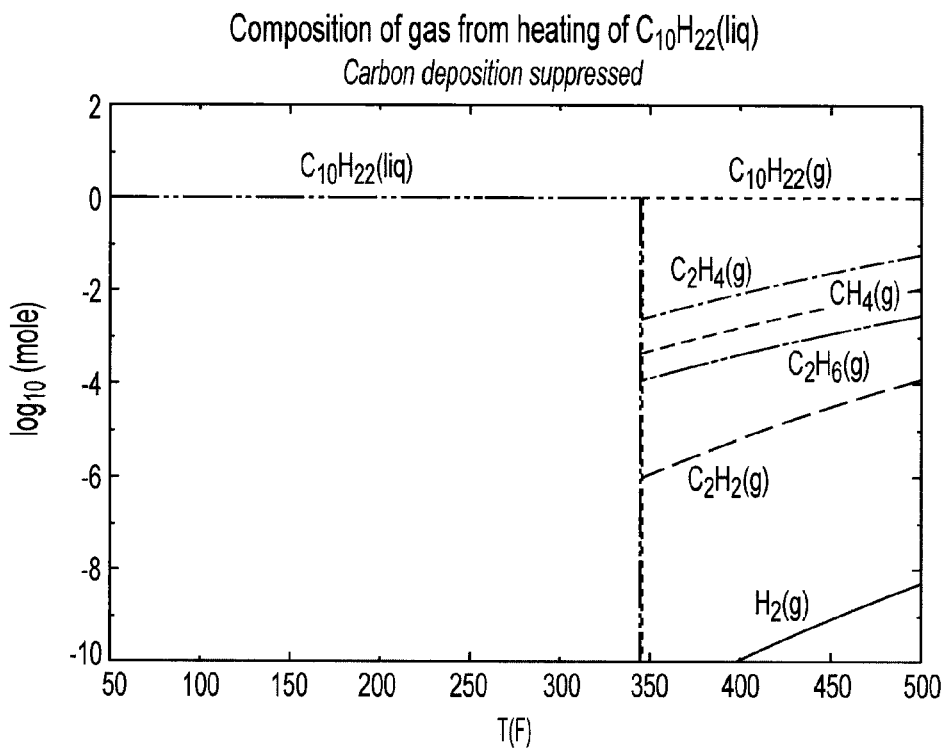

Thermodynamic calculations indicate that the equilibrium state of the fuel is associated with a decomposition involving formation of carbon, as well as gaseous products. However, since insufficient time is available for carbon formation in the fuel in practice, its formation has been suppressed for purposes of the calculations and gas compositions calculated accordingly. FIGS. 14 and 15 summarize the results of these calculations.

FIGS. 14 and 15 provide information not only on the compositions of the gas phase resulting from the reforming of $C_8H_{18}$ and $C_{10}H_{22}$, but also on the temperatures at which the liquid fuel decomposes into gaseous products.

B. Gas Composition Resulting from Combustion with O2

The gas phase resulting from the fuel reforming was next completely combusted with 12.5 mols O2 or 15.5 mols O2 in the case of $C_8H_{18}$ and $C_{10}H_{22}$ respectively. The calculations have been carried out for the temperature range 900 to 2000 F. The temperature at which the fuel gas and oxygen are fed into the combustion process has no influence on the calculated composition of the gas resulting from the combustion itself.

Figure 16:
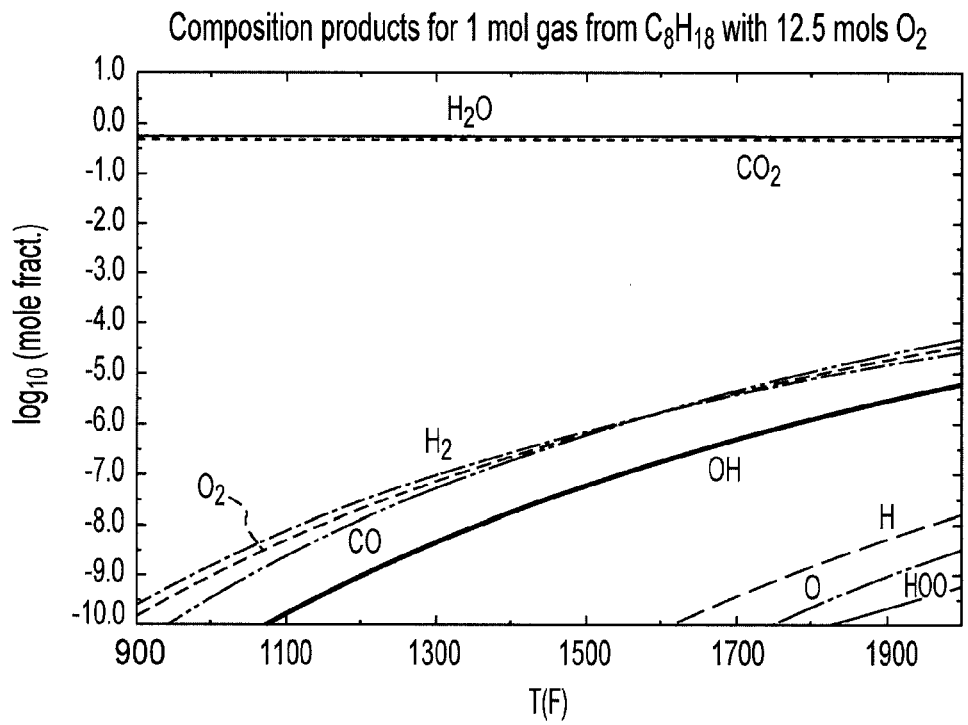
Figure 17:
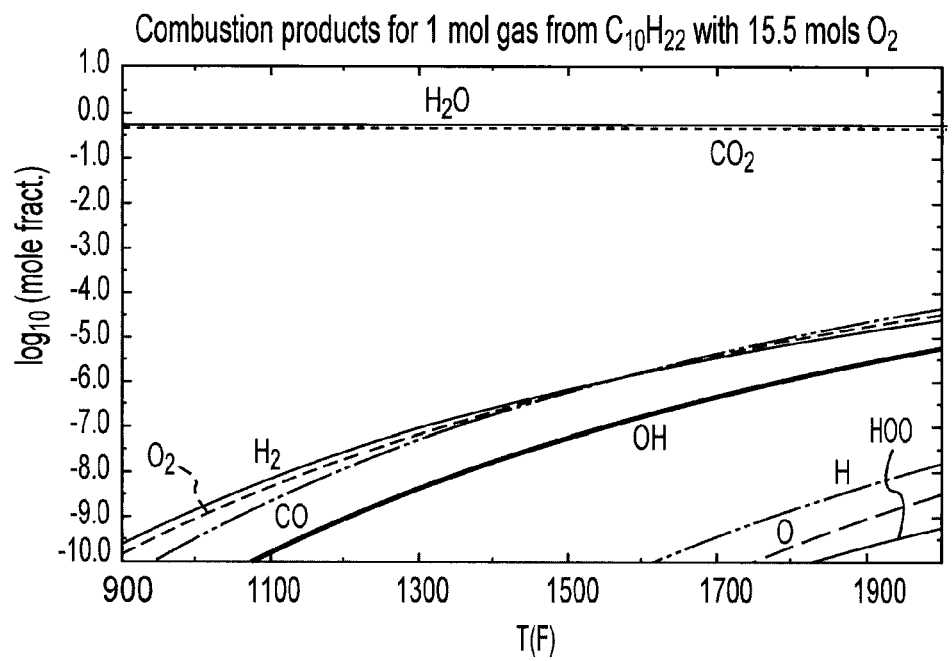

FIGS. 16 and 17 disclose the composition of the gas resulting from the combustion of $C_8H_{18}$ and $C_{10}H_{22}$ respectively with O2.

C. Enthalpy Change Resulting from Combustion with O2

Figure 18:
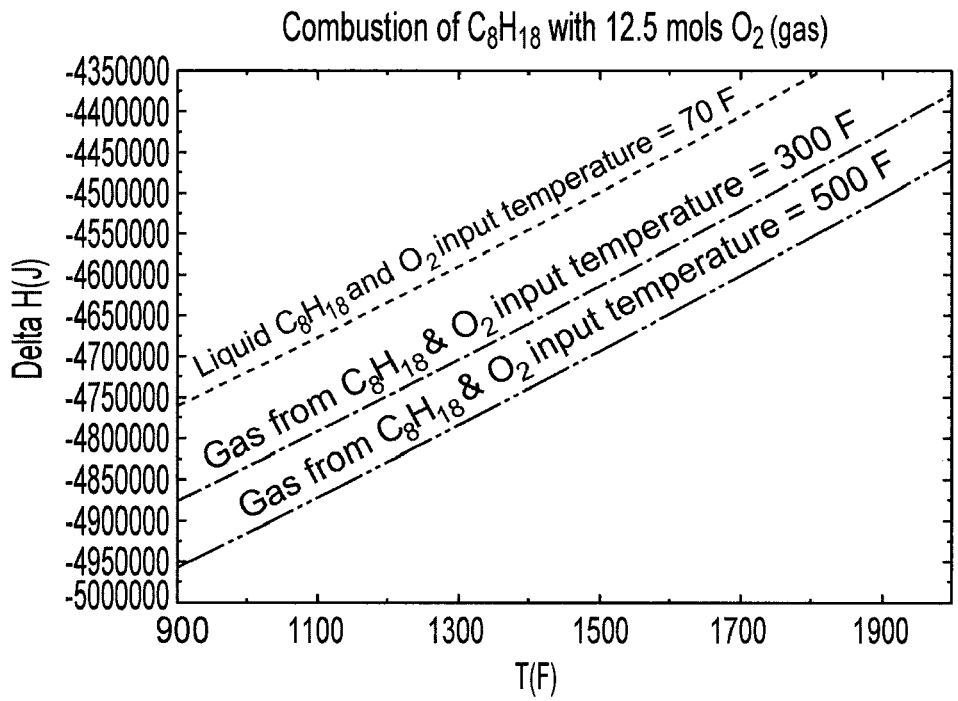
Figure 19:
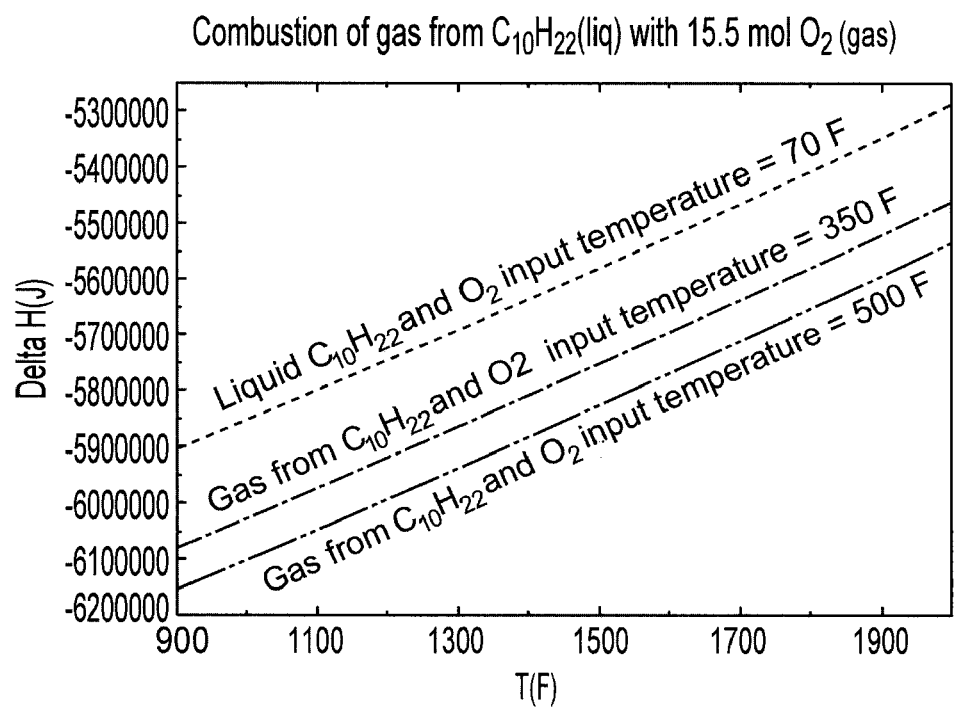

The enthalpy change accompanying the combustion of the gas phase resulting from the reforming of $C_8H_{18}$ and $C_{10}H_{22}$ respectively was calculated for different temperatures of the gaseous fuel input into the combustion chamber. The enthalpy of reaction is highly exothermic and essentially linear with combustion temperature. These findings are illustrated in FIGS. 18 and 19, where the results are compared with the corresponding data for combustion of liquid fuel.

The reforming process results in a significant increase in the enthalpy change accompanying the combustion process and the effect is greater the higher the temperature at which the gaseous fuel is introduced into the combustion chamber. There is a calculated increase of approximately 4% over the enthalpy change resulting from combustion of liquid fuel (introduced at 70 F) if the gaseous fuel is introduced at a temperature of 500 F.

D. Hypothetical Adiabatic Temperature for the Combustion Process

Figure 20:
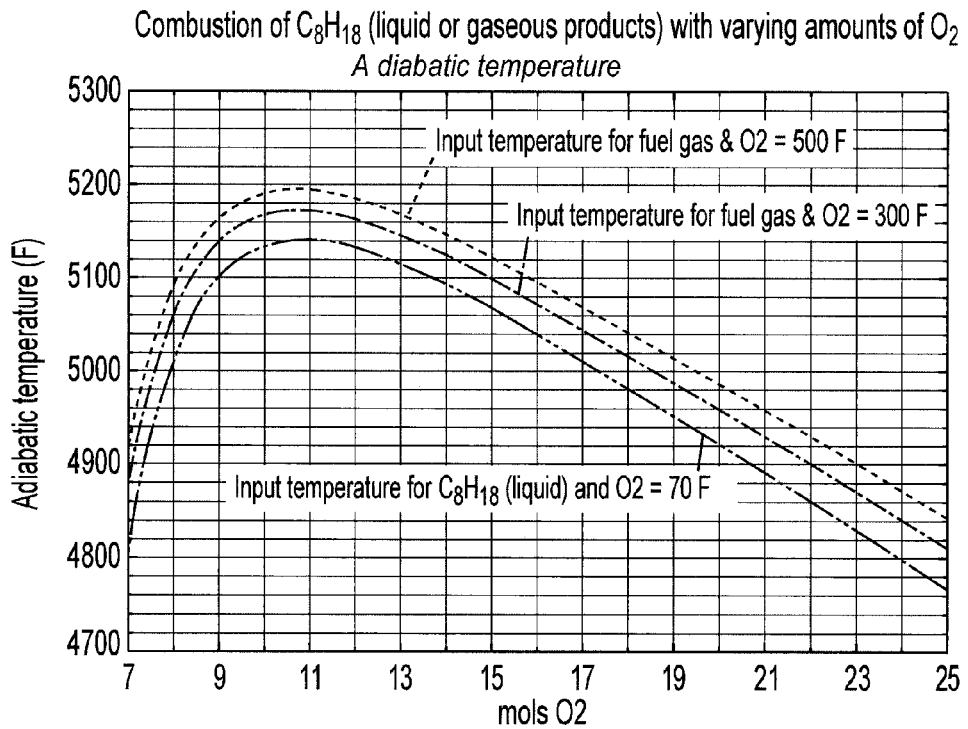
Figure 21:
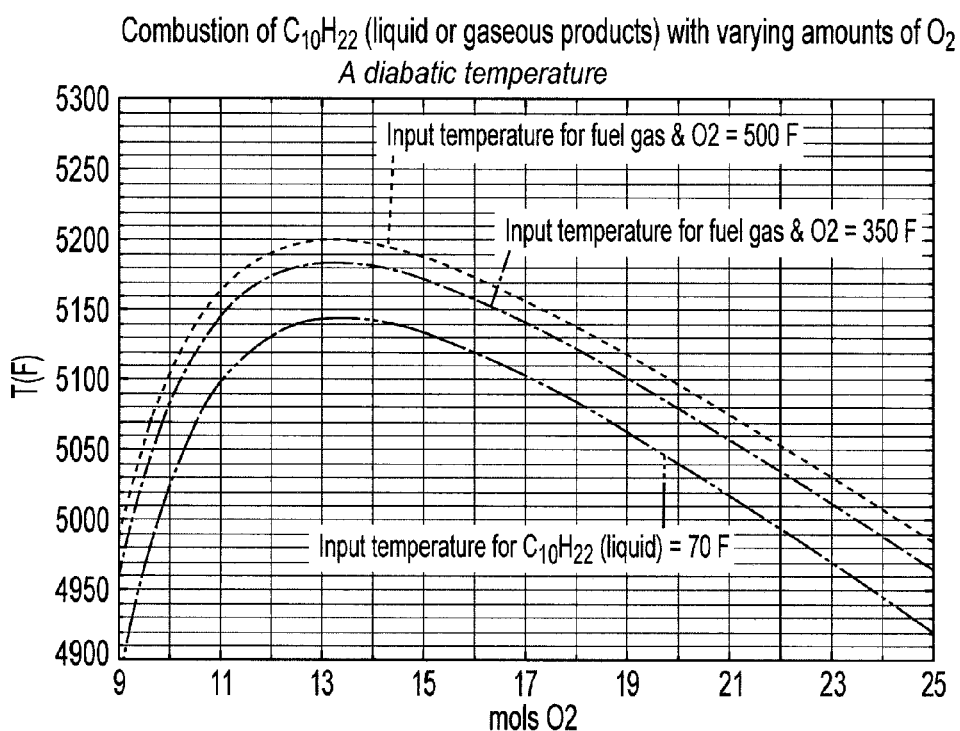

For each of the gaseous fuels, the hypothetical adiabatic temperature was calculated for different reacting amounts of oxygen. Comparison with the corresponding values for combustion of liquid fuels is made in FIGS. 20 and 21.

E. Cooling of Combustion Gases

Figure 22:
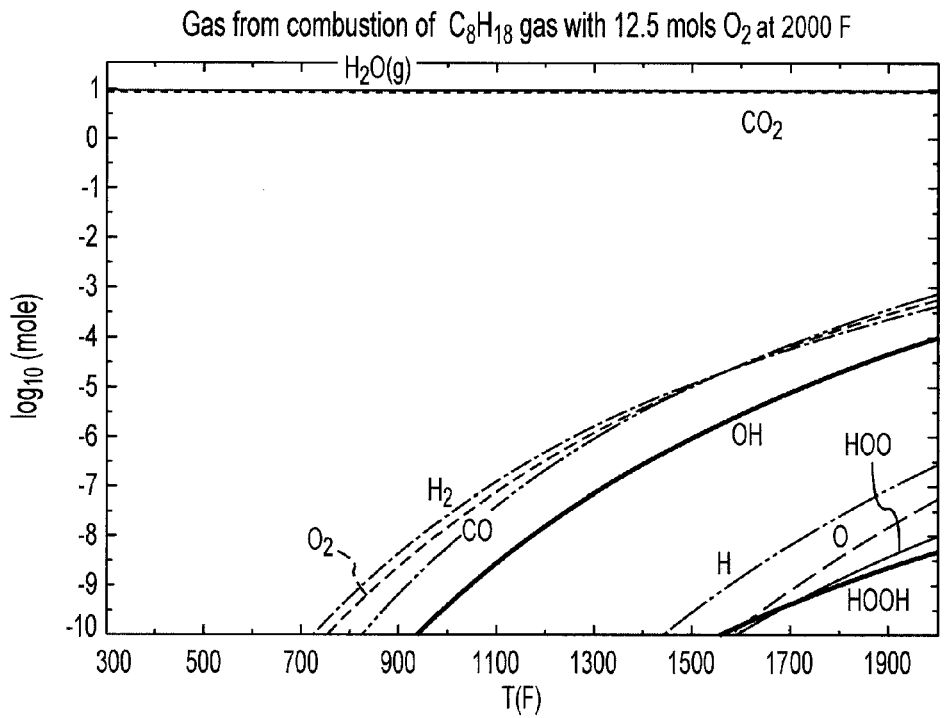
Figure 23:
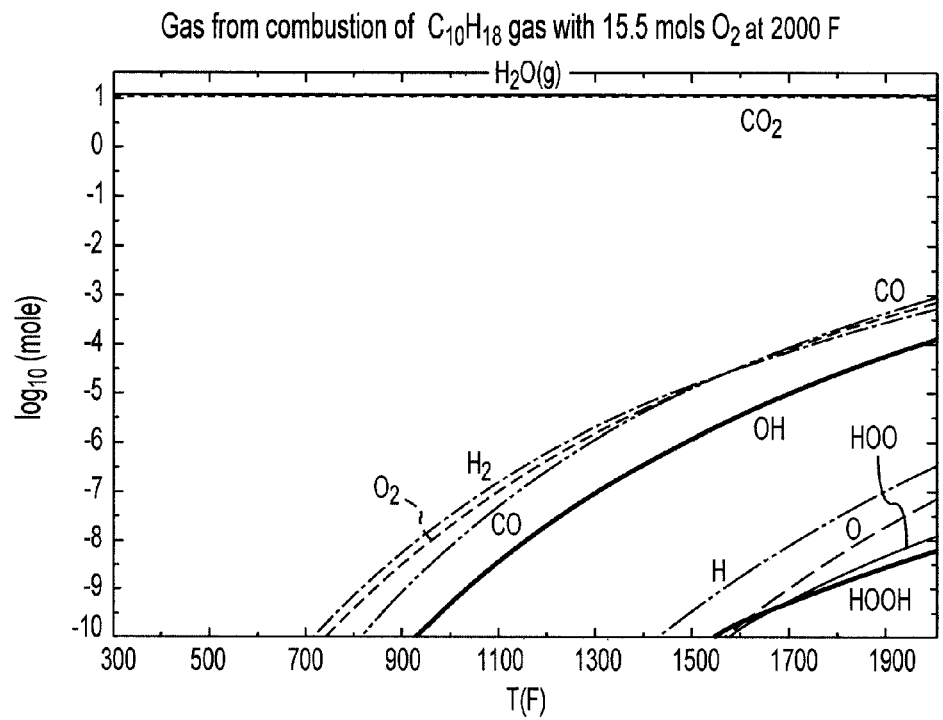

The calculations imply complete combustion of the fuel in each case, with formation of H2O and CO2 as the main combustion products. It is likely that this will not be the case in practice, and larger quantities of CO, H2 and other gaseous species will be present in the exhaust gas. FIGS. 22 and 23 illustrate the equilibrium composition of the exhaust gas on cooling from the combustion temperature, but even for this optimum case, it is unlikely that equilibrium will be established at all temperatures. More likely is that, with rapid cooling, the gas composition will be closer to that of the combustion temperature and hence to the compositions at the right hand vertical axis.

F. Calculations for Combustion of Fuels with Air

The calculations make clear the influences of different parameters on the reforming and combustion processes of the fuel, but are simplified by using oxygen, rather than air, as the second partner of the combustion process.

A final series of calculations has therefore been carried out for combustion of the gases from $C_8H_{18}$ with air, to investigate the resulting changes produced in the diagrams presented.

Figure 24:
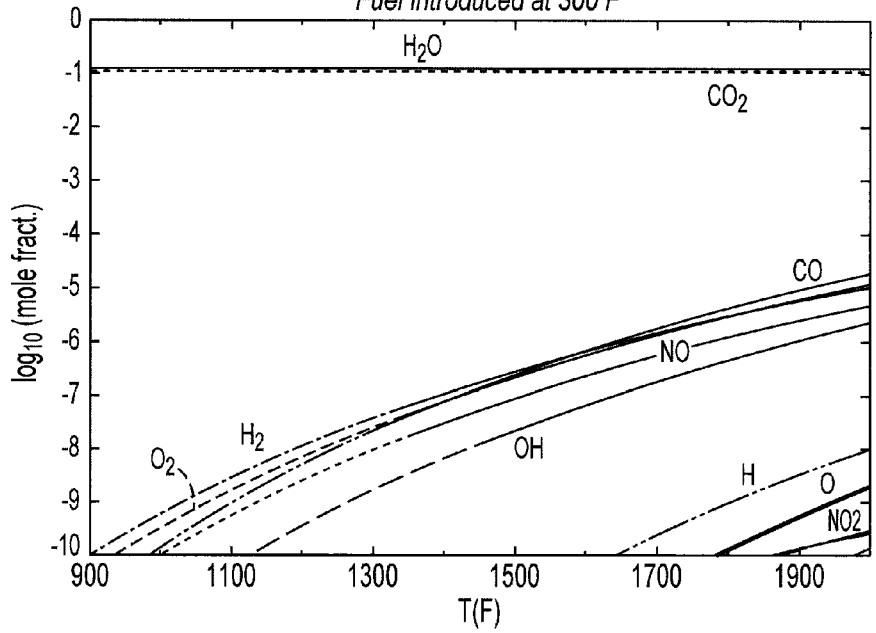
Figure 25:
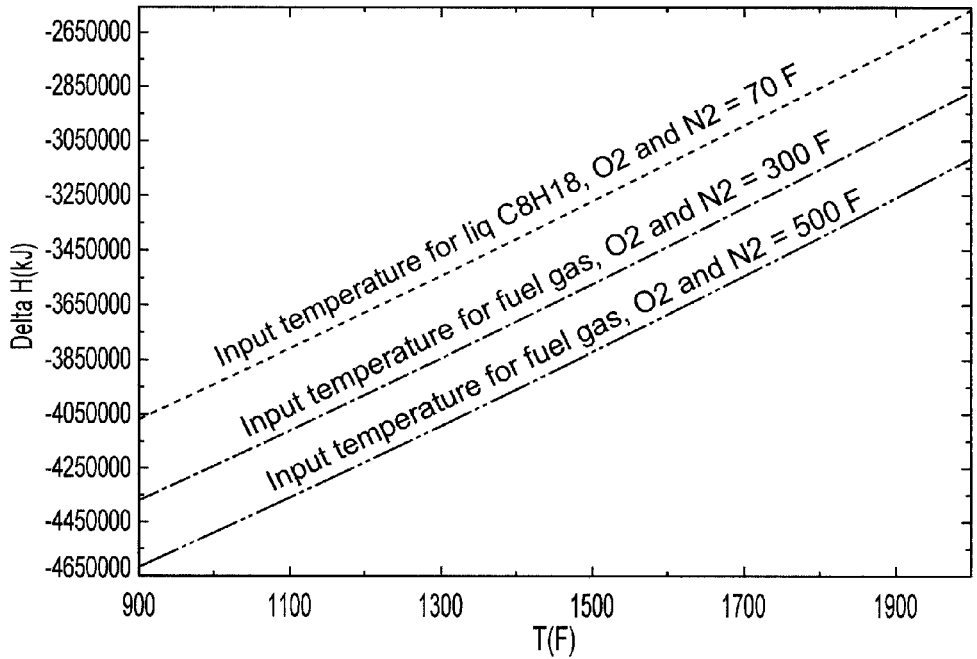

FIG. 24 presents the gas composition resulting from combustion of the gases from 1 mol $C_8H_{18}$ with 12.5 mols O2 and 50 mols N2. The presence of NO and NO2 in the gaseous products is now evident. FIG. 25 compares the enthalpy change accompanying combustion of $C_8H_{18}$ in air for different input conditions of the fuel. As for combustion with O2 alone, the reforming process results in a significant increase in the enthalpy change accompanying combustion with air, and the effect is greater the higher the temperature at which the gaseous fuel is introduced into the combustion chamber. There is a calculated increase of approximately 12% over the enthalpy change resulting from combustion of liquid fuel (introduced at 70 F) if the gaseous fuel is introduced at a temperature of 500 F.

Figure 26:
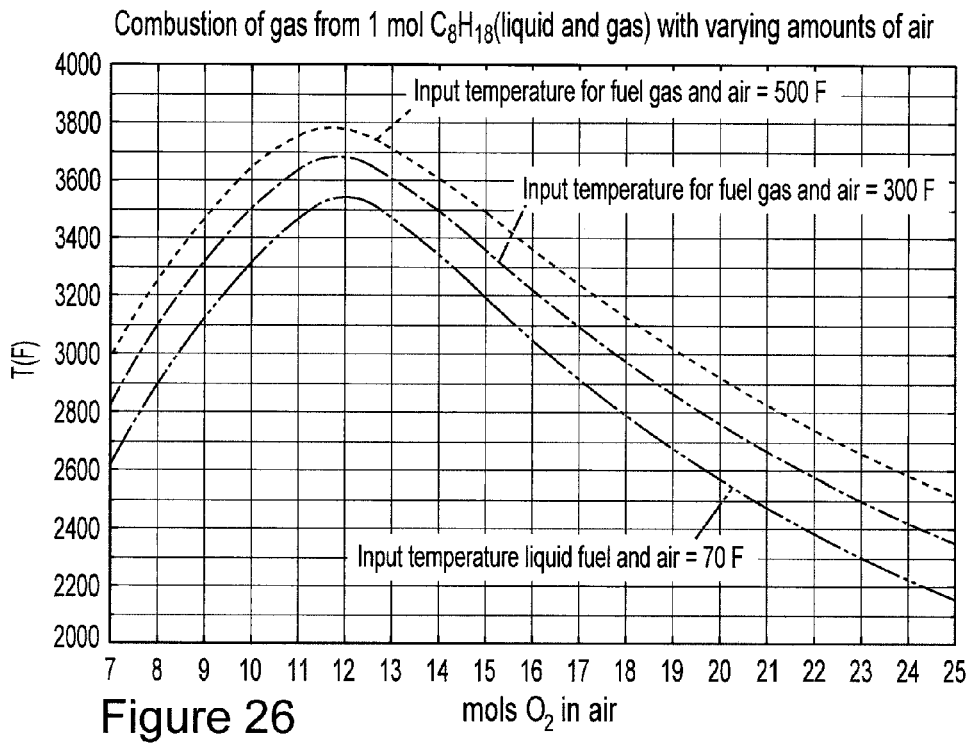

The calculated adiabatic temperature change for combustion of $C_8H_{18}$ with air under different conditions of the fuel input is shown in FIG. 26. The calculated adiabatic temperatures are significantly lower than the corresponding values for combustion with O2 alone, due to the large amount of nitrogen being heated in the process. Of particular importance, apart from the enthalpy change, is the volume change accompanying the combustion with air of liquid or gaseous fuel introduced at different temperatures.

Figure 27:
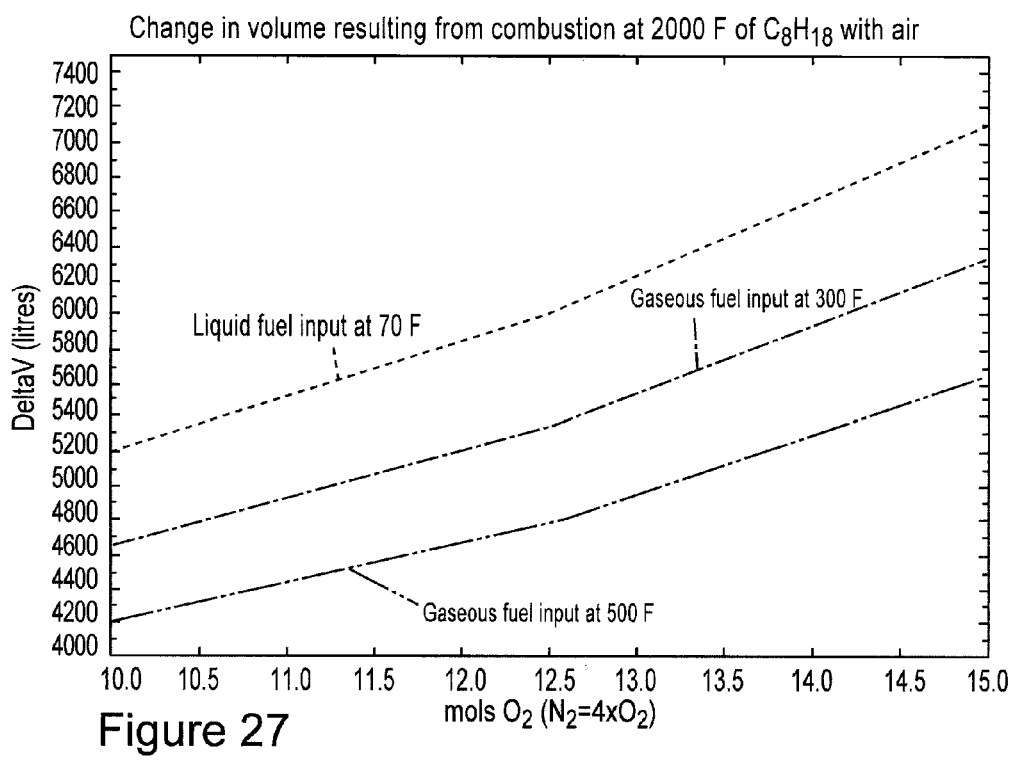

FIG. 27 illustrates the effect of these parameters on the expansion accompanying combustion. The diagram shows that use of reformed C8H18 results in a significantly smaller volume increase than that accompanying combustion of liquid fuel introduced into the combustion chamber at a lower temperature. The volume difference is about 20% for gaseous fuel introduced at 500° F. and about 11% for gaseous fuel introduced at 300 F. This difference will work against the benefits of increased enthalpy of the reaction by providing less expansion of the combustion gases.

Figure 28:
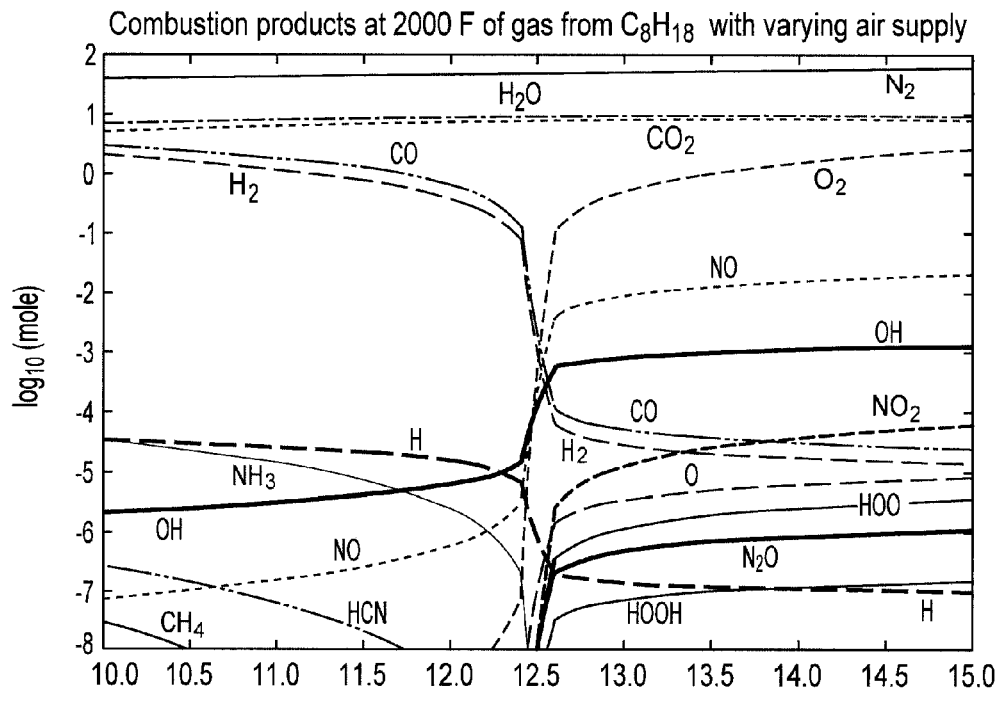

FIG. 28 shows how use of too little, or an excess, of air (oxygen) for the combustion will have a large influence on the gaseous species formed and on their amounts. Use of too little oxygen for the combustion (less than 12.5 mols, for example) results in large quantities of CO and H2 in the product gas, while an excess of oxygen (greater than 12.5 mols, for example) leads to formation of nitrogen oxides in significant amounts.

While FIG. 28 represents conditions for a combustion temperature of 2000° F., rapid cooling of the exhaust gas may result in unwanted species being retained at exhaust pipe exit temperatures. The calculations noted clearly demonstrate the potential for obtaining an increased enthalpy of combustion of the fuel as a result of the proposed reforming process. This advantage appears to be counteracted by a decrease in volume, relative to use of liquid fuel at lower temperatures, of the gases resulting from the combustion. This advantage contributes to increased MPG and decreased volumes of effluent.

Figure 29:
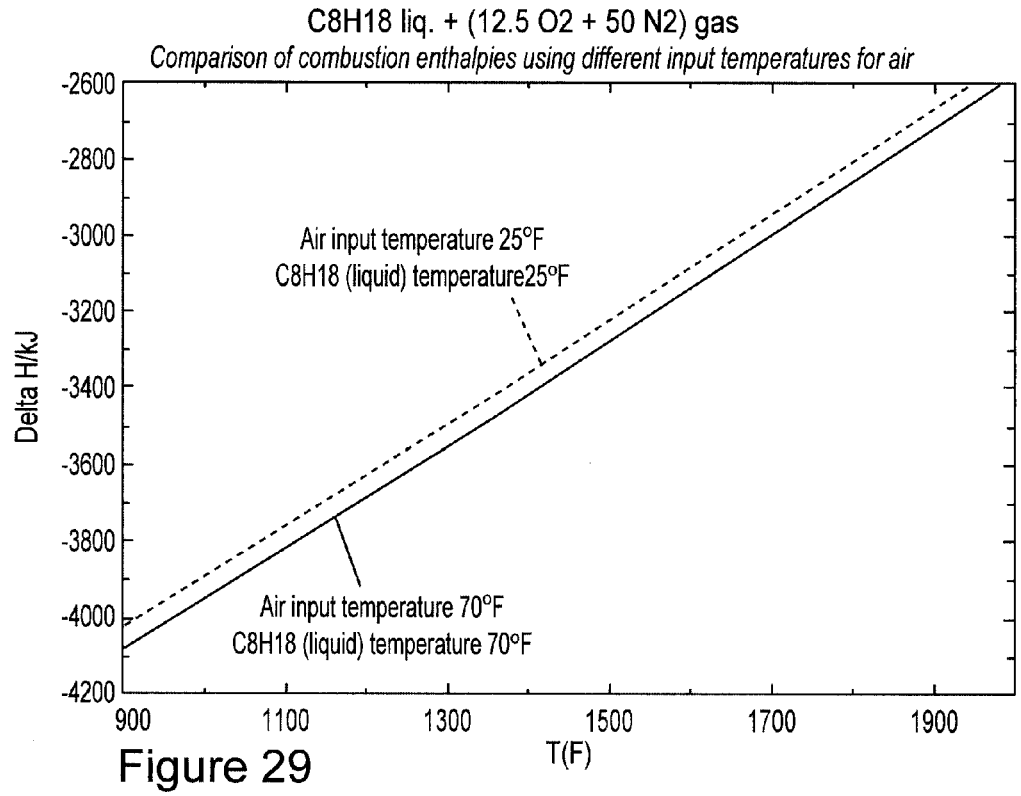

Turing to FIG. 29, the data illustrates the powerful influence of increased, or decreased, Enthalpy or heat value of liquid octane (C8H18) from changes in ambient air temperature alone for combustion air. In FIG. 29, the Enthalpy @ 70° F. vs. 25° F. was reduced by 1.25% over a 45° drop in temperature to 25° F.

Enthalpy of the air fuel mixture of the liquid phase octane (C8H18 and converted to the gas phase by catalytic conversion), can be increased approximately 13%+over the base Enthalpy through conversion of liquid octane to gas phase octane, coupled with the heating of combustion air and fuel. Base Enthalpy represents average conditions of ambient environmental temperature of both fuel and air.

Figure 30:
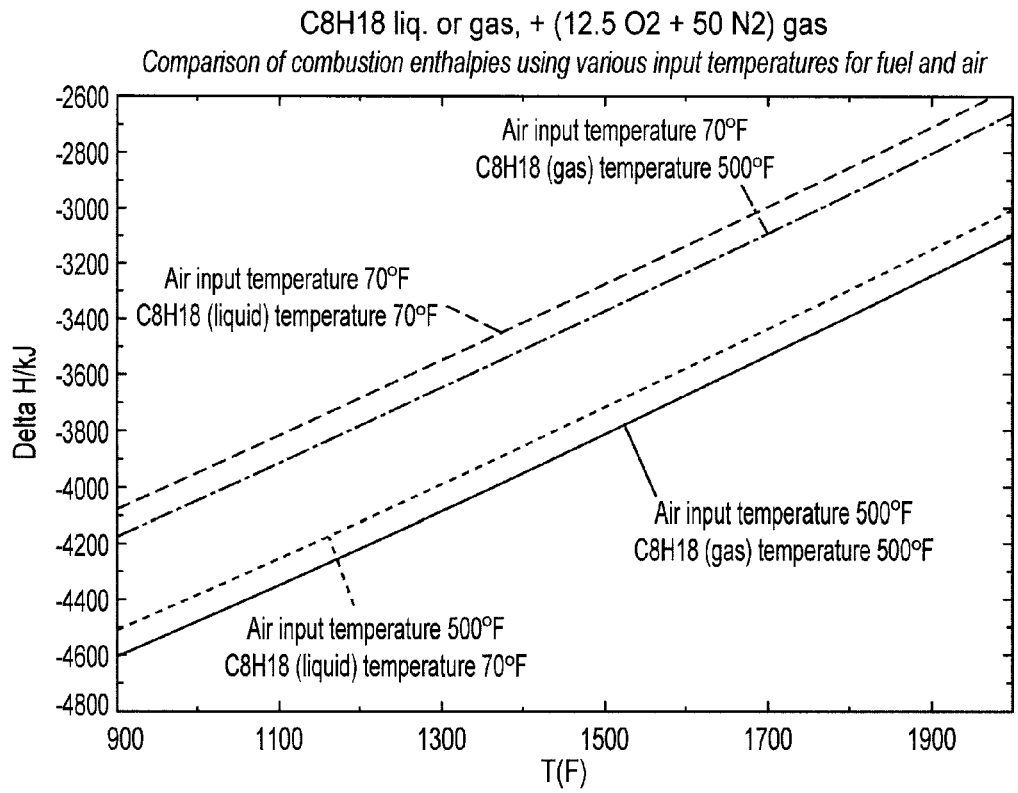

Heating of the air to a temperature of 500° F., for example, will match that of the gas phase coming out of the catalytic converter at 500° F., enabling the increased energy of combustion. FIG. 30 displays the base Enthalpy and the three different variable combinations of values combusted at a temperature of 900° F., for example.

The different combinations delivered to the engine combustion chamber are as follows:

| | |
|---|---|
| Base: | Air 70° F. and Octane Fuel 70° F. (Liquid Phase) |
| Variables #1 | Air 70° F. and Octane Fuel 500° F. (Gas Phase) |
| Variables #2 | Air 500° F. and Octane Fuel 70° F. (Liquid Phase) |
| Variables #3 | Air 500° F. and Octane Fuel 500° F. (Gas Phase) |

The increase in Enthalpy (Heat Value of the Fuel) the base condition for each set of Variables is as follows: (Enthalpy is displayed as a minus value, and the larger the minus value, the higher the Enthalpy, or Heat Value of the fuel.) The combustion value of 900° F. is an arbitrary value for this study as other temperatures are also appropriate. Liquid Phase Octane and Gas Phase Octane are chemically identical, varying only in Enthalpy, Gas Phase Octane being higher.

| | | |
|---|---|---|
| Base | −4,075,000 Joules | Δ % Above Base |
| Variables #1 | −4,175,000 Joules | 2.5% |
| Variables #2 | −4,500,000 Joules | 10.4% |
| Variables #3 | −4,600,000 Joules | 13.0% |

The Base conditions will vary with the seasons, and the temperature of the air and fuel, and that is also why MPG varies seasonally. Temperatures of the combustion air and fuel have a significant influence on MPG. For aircraft engines especially, which would be more significant than for land-based operations, over 80 to 90% of the combustion air at high altitudes is sub-zero year round.

Figure 31:
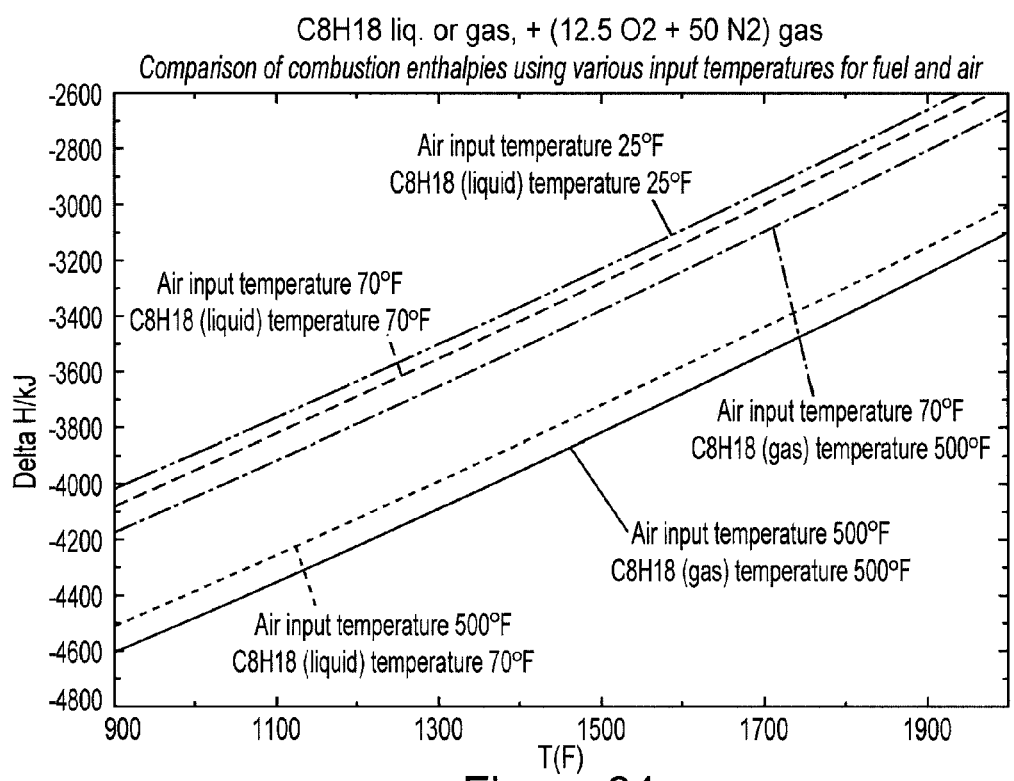

FIG. 31 discloses the Enthalpy values, plus Enthalpy values for a current average ambient temperatures of 25° F. for both Air and octane fuel at 25° F. While the local temperature has fluctuated from approximately 10° F. to 40° F., a mean temperature of 25° F. has been selected to display the sensitivity of the Enthalpy factor and MPG and reduced pollution as related to temperature of the air and fuel.

To further confirm this claim, for example, a Toyota Avalon 2008 Model, 6 cylinders, 265 HP auto, was averaging 28 MPG, at the average temperature of 70° F., and when encountering 25° F. average temperature, has dropped −3 MPG during this period. These values were for a combination of highway and city driving between Providence and Boston. The change of Enthalpy from the Base of 70° F. to 25° F. has dropped to −4,010,000 Joules vs. the Base of −4,060,000 Joules, a −1.25% loss of Enthalpy, and MPG. This data offers a sound backup to the positive increase of heating the air, the octane, and the catalytic conversion of the octane liquid phase to the octane gas phase. A smaller engine Chevrolet 2008 Cobalt 2LT showed a similar loss of −2.0 MPG for city driving primarily.

With these overall improvements in MPG, and reduction in environmental pollution by auto engines, diesel engines, stationary engines, and aircraft engines, for example, all would add significantly to the well being of planet earth, and saving of natural resources. In temperatures below an average of 70° F., to cooler temperatures of 25° F. average, a net gain of 13% to 15% MPG, for example, and an equivalent reduction of polluting effluent green house gases are reasonable and possible.

Figure 32:
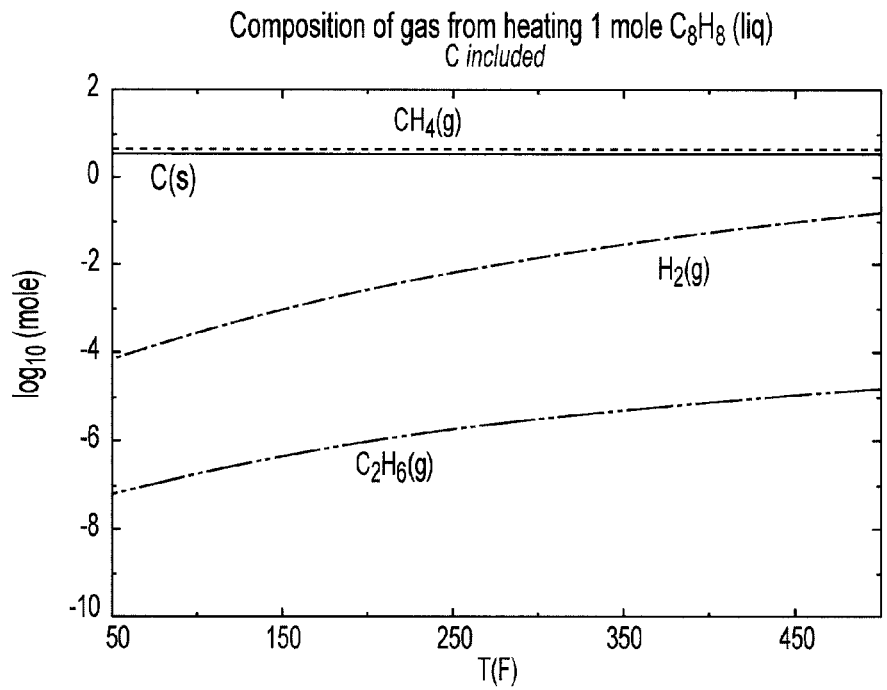

Thermodynamic calculations indicate that the equilibrium state of octane fuel is associated with a full decomposition into solid carbon, and a gas phase consisting almost entirely of methane and hydrogen, as shown in FIG. 32.

However, under usual conditions involving engine operation, inhibited nucleation and insufficient time are available for carbon formation from the fuel. Further, the boiling point of octane (258° F.) has been well established experimentally, showing that liquid C8H18 is stable to the boiling point. Carbon formation has therefore been suppressed in all subsequent calculations of the gas compositions resulting from heating of liquid octane.

In theory, gas and liquid species containing up to 8 atoms of C might be formed on heating liquid octane. A series of calculations has therefore been carried out, firstly including species with up to 8 C atoms, then up to 7, then up to 6, and so on, to investigate the influence of such variation on the gas and liquid phase formed.

Figure 33:
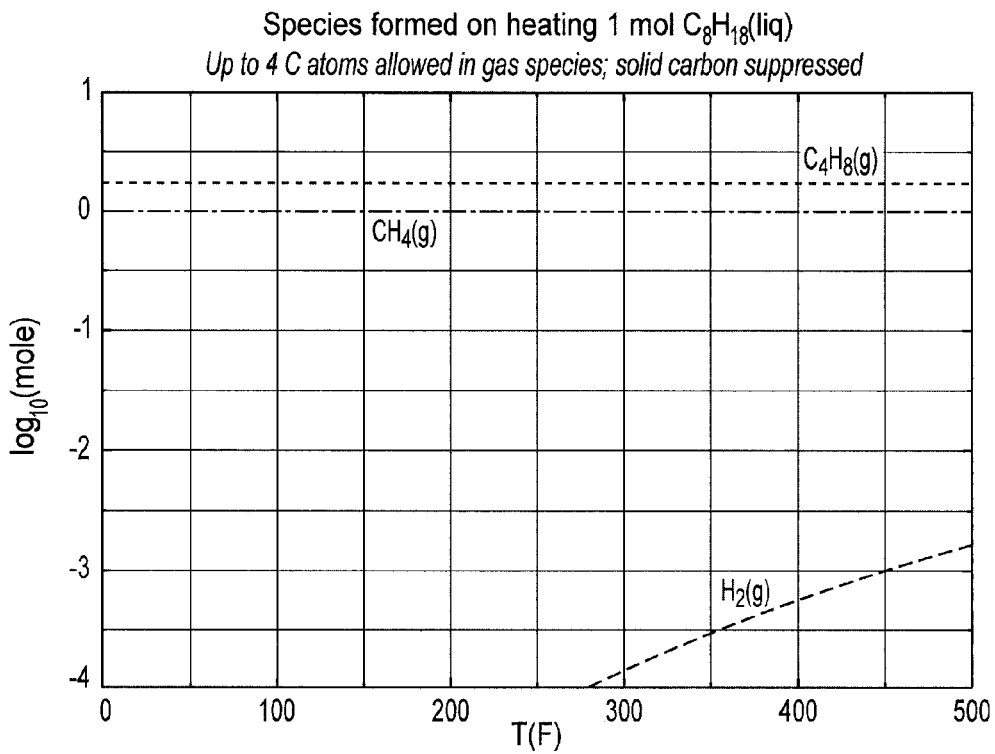
Figure 34:
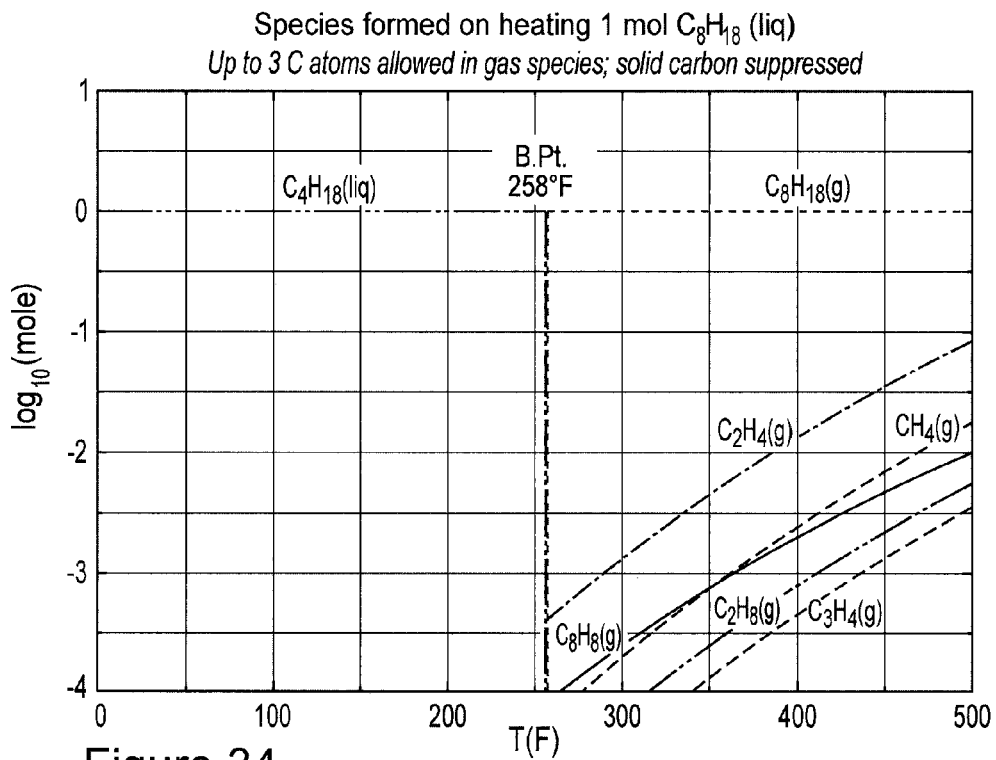
Figure 35:
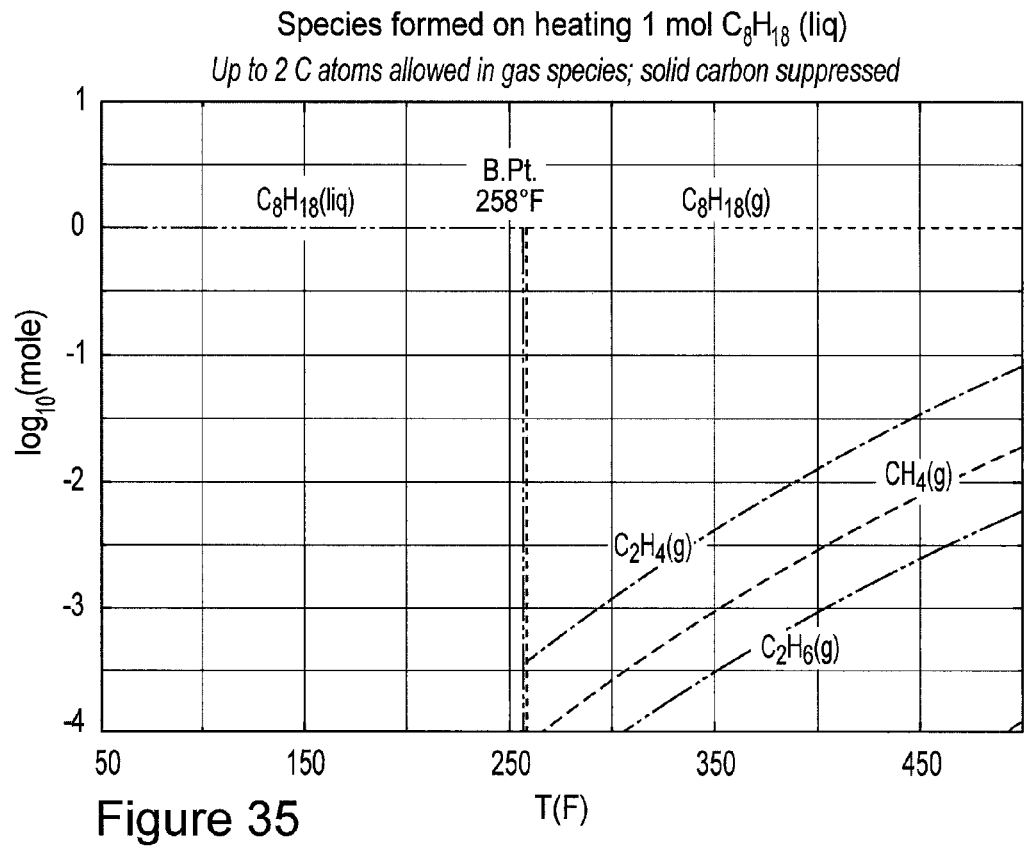

The results show that no liquid phase is stable at any temperature up to 500° F., unless the species in the gas phase contain a maximum of 3 carbon atoms. This is shown in FIGS. 33-35, which represent calculations for inclusion of gas species with a maximum of 4, 3, and 2 carbon atoms respectively.

It is clear from the FIGS. that conditions found in practice, i.e. liquid octane stable to the boiling point of 258° F. and no carbon produced on heating, can only be reproduced by the calculations if gas species containing a maximum of 2 or 3 carbon atoms are included. In both of these cases, the major gas specie on transformation of 1 mol octane from liquid to gas is 1 mol C8H18(g). The second most abundant gas specie observed at the transformation is C2H4(g), with a concentration over 1000 times smaller than that of gaseous octane. Hence, for all intents and purposes, in particular for all enthalpy calculations, the transformation of liquid octane to gas at the boiling point, and higher, results in a gas having the same chemical composition (C8H18) as the liquid.

It will be understood that various modifications may be made to the embodiments disclosed herein. Therefore, the above description should not be construed as limiting, but merely as exemplifications of the various embodiments of the invention. Those skilled in the art will envision other modifications within the scope and spirit of the claims appended hereto.

What is claimed is:

1. A fuel reforming system comprising:
   a catalytic chamber containing a catalyst adjacent a heating chamber;
   at least one heat exchanger adjacent the heating chamber, the at least one heat exchanger being distributed along an outer surface of the catalytic chamber and includes at least one continuous portion and at least one segmented portion;
   an inlet and exit port in communication with the catalytic chamber;
   liquid fuel in communication with an inlet port;
   gaseous fuel in communication with an exit port, whereby the molecular composition of the liquid fuel entering the inlet port is the same as the molecular composition of the gaseous fuel exiting the exit port;
   an end cap for encapsulating an end of the catalytic chamber and the heat exchanger, the end cap further including one of the inlet and exit ports; and
   wherein the catalytic chamber is at least partially surrounded by the heat exchanger, the catalytic chamber and heat exchanger being hermetically sealed from each other.

2. A fuel reforming system of claim 1, wherein the heat chamber and the catalytic chamber are substantially formed from stainless steel, the stainless steel including an alloy that enhances a catalytic reaction within the catalytic chamber.

3. A fuel reforming system of claim 1, wherein the heat exchanger distributes heat by way of turbulent air flow until a maximum temperature of 400 to 500 degrees Fahrenheit is substantially attained for converting the liquid fuel from a liquid phase into a gaseous phase.

4. A fuel reforming system of claim 2, wherein the alloy is nickel.

5. A fuel reforming system of claim 1, wherein the liquid fuel enters the catalytic chamber from a fuel filter in a liquid phase, turns into vapor within the catalytic chamber, and exits as the gaseous fuel.

6. A fuel reforming system of claim 1, wherein the heating chamber utilizes pre-heated air received from an exhaust manifold of an internal combustion engine.

7. A fuel reforming system of claim 1, wherein the catalyst includes an alloy comprising catalytic metals from any one or more of the platinum, nickel and manganese groups.

8. A fuel reforming system of claim 7, wherein the ratio of platinum to another catalytic metal from the platinum group is substantially between 65:35 and 90:10.

9. A fuel reforming system of claim 7, wherein the ratio of platinum to another catalytic metal from the platinum group is substantially 85:15.

10. A fuel reforming system of claim 1, wherein the catalytic chamber further comprises at least one screen member having a surface, wherein the at least one screen member includes the catalyst attached to the surface.

11. A fuel reforming system of claim 10, wherein the at least one screen member is positioned substantially perpendicular to a longitudinal axis of the catalytic chamber.

12. A fuel reforming system of claim 1, further including a temperature sensor controlling the temperature of the catalytic chamber.

13. A fuel reforming system of claim 1, wherein the least one heat exchanger distributes heat by way of turbulent airflow outside the catalytic chamber until a maximum temperature is attained within the catalytic chamber.

14. A fuel reforming system of claim 1, wherein a flow control valve regulates the flow of heat received from an exhaust manifold into the catalytic chamber.

15. A fuel reforming system of claim 14, wherein the flow control valve is attached to the heating chamber and the exhaust manifold.

16. A fuel reforming system of claim 1, wherein the heating chamber provides heat from an external source to an area at least partially surrounding and external to the catalytic chamber.

* * * * *